(12) United States Patent
Meyer et al.

(10) Patent No.: US 11,939,500 B2
(45) Date of Patent: Mar. 26, 2024

(54) DIECUT ESPECIALLY FOR PERMANENTLY CLOSING HOLES

(71) Applicant: tesa SE, Norderstedt (DE)

(72) Inventors: Katja Meyer, Hamburg (DE); Tim Baumann, Hamburg (DE); Christoph Nagel, Hamburg (DE)

(73) Assignee: tesa SE, Norderstedt (DE)

( * ) Notice: Subject to any disclaimer, the term of this patent is extended or adjusted under 35 U.S.C. 154(b) by 165 days.

(21) Appl. No.: 17/449,177

(22) Filed: Sep. 28, 2021

(65) Prior Publication Data

US 2022/0105708 A1 Apr. 7, 2022

(30) Foreign Application Priority Data

Oct. 5, 2020 (DE) ................ 10 2020 212 530.9

(51) Int. Cl.
*C09J 7/29* (2018.01)
*B32B 5/02* (2006.01)
(Continued)

(52) U.S. Cl.
CPC ............... *C09J 7/29* (2018.01); *B32B 5/022* (2013.01); *B32B 5/024* (2013.01); *B32B 7/12* (2013.01);
(Continued)

(58) Field of Classification Search
CPC .. C09J 7/29; C09J 7/385; B32B 5/022; B32B 5/024; B32B 7/12; B32B 7/20;
(Continued)

(56) References Cited

U.S. PATENT DOCUMENTS

| 4,387,176 A | 6/1983 | Frye |
| 5,288,429 A | 2/1994 | von Bonin |

(Continued)

FOREIGN PATENT DOCUMENTS

| DE | 43 13 008 C1 | 11/1994 |
| EP | 0 515 892 A1 | 12/1992 |

(Continued)

OTHER PUBLICATIONS

"Handbook of Pressure Sensitive Adhesive Technology" by Donatas Satas (van Nostrand, New York 1989.
(Continued)

*Primary Examiner* — Michael Zhang
(74) *Attorney, Agent, or Firm* — Norris McLaughlin, P.A.

(57) ABSTRACT

Diecuts and methods for closing of holes in metal sheets or in plastics parts are disclosed. The diecuts have a carrier composed of an assembly that comprises a metallic first layer having a thickness of 10 to 40 μm, a second layer of a woven or laid glass fabric having a basis weight of 30 to 200 g/m², an optional first adhesive third layer, an unexpanded expandable graphite fourth layer having a thickness of at least 0.2 to 3.0 mm, and a second adhesive fifth layer. The expandable graphite being present in the fourth layer to an extent of at least 80 wt % and fifth layer being formed by an adhesive having a basis weight of 300 to 1800 g/m² and/or a thickness of 400 to 1800 μm.

20 Claims, 3 Drawing Sheets

(51) Int. Cl.
*B32B 7/12* (2006.01)
*B32B 9/04* (2006.01)
*B32B 15/14* (2006.01)
*B32B 15/20* (2006.01)
*C09J 7/38* (2018.01)

(52) U.S. Cl.
CPC ............... *B32B 9/04* (2013.01); *B32B 15/14* (2013.01); *B32B 15/20* (2013.01); *C09J 7/385* (2018.01); *B32B 2260/021* (2013.01); *B32B 2260/046* (2013.01); *B32B 2262/101* (2013.01); *B32B 2307/718* (2013.01); *B32B 2307/732* (2013.01)

(58) Field of Classification Search
CPC ........ B32B 2260/021; B32B 2260/046; B32B 2262/101; B32B 2307/718; B32B 2307/32; B29C 73/10
See application file for complete search history.

(56) References Cited

U.S. PATENT DOCUMENTS

| | | | |
|---|---|---|---|
| 5,789,487 A | 8/1998 | Matyjaszewski et al. | |
| 5,854,364 A | 12/1998 | Senninger et al. | |
| 5,945,491 A | 8/1999 | Matyjaszewski et al. | |
| 6,281,298 B1* | 8/2001 | Papsin, Jr. | B32B 27/00 525/309 |
| 6,613,870 B1 | 9/2003 | Harder et al. | |
| 6,720,399 B2 | 4/2004 | Husemann et al. | |
| 6,765,078 B2 | 7/2004 | Husemann et al. | |
| 7,087,670 B2 | 8/2006 | Hoch et al. | |
| 10,519,344 B2 | 12/2019 | Korthals et al. | |
| 10,519,345 B2 | 12/2019 | Korthals et al. | |
| 10,828,841 B2 | 11/2020 | Niemeyer et al. | |
| 2003/0125447 A1 | 7/2003 | Hoch et al. | |
| 2004/0092685 A1 | 4/2004 | Husemann et al. | |
| 2004/0097638 A1 | 5/2004 | Centner et al. | |
| 2010/0056687 A1* | 3/2010 | Diakoumakos | C08L 83/04 977/773 |
| 2010/0104864 A1 | 4/2010 | Zoellner et al. | |
| 2011/0100550 A1* | 5/2011 | Himmelsbach | C09J 7/35 156/332 |
| 2012/0279637 A1 | 11/2012 | Siebert et al. | |
| 2012/0279755 A1 | 11/2012 | Korthals et al. | |
| 2014/0044960 A1 | 2/2014 | Guenzler et al. | |
| 2016/0200075 A1* | 7/2016 | Dietze | C09J 113/00 428/63 |
| 2016/0271866 A1* | 9/2016 | Niemeyer | B29C 65/48 |
| 2017/0226308 A1* | 8/2017 | Czerwonatis | B29C 44/569 |

FOREIGN PATENT DOCUMENTS

| | | |
|---|---|---|
| EP | 0 578 151 A | 1/1994 |
| EP | 1 311 555 B1 | 3/2005 |
| EP | 1 791 922 A1 | 6/2007 |
| EP | 1 978 069 A1 | 10/2008 |
| EP | 1 378 527 B1 | 11/2008 |
| EP | 3 036 100 A1 | 6/2010 |
| EP | 2 520 627 A1 | 11/2012 |
| EP | 2 520 628 A1 | 11/2012 |
| EP | 2 520 629 A1 | 11/2012 |
| EP | 2 522 705 A1 | 11/2012 |
| EP | 2 695 926 A1 | 2/2014 |
| JP | 2000345638 A | 12/2000 |
| JP | 2006161435 A | 6/2006 |
| JP | 2009215721 A | 9/2009 |
| JP | 2015007357 A | 1/2015 |
| JP | 2016530373 A | 9/2016 |
| JP | 60 71305 B2 | 2/2017 |
| JP | 2019104815 A | 6/2019 |
| WO | 01/88029 A1 | 11/2001 |
| WO | 2015/024726 A1 | 2/2015 |
| WO | 2021/003327 A1 | 1/2021 |

OTHER PUBLICATIONS

Tables by the method of Fikentscher [P.E. Hinkamp, Polymer, 1967, 8, 381].
Fox equation (E1) (cf. T.G. Fox, Bull. Am. Phys. Soc. 1 (1956) 123).
Houben Weyl, Methoden der Organischen Chemie, vol. E 19a, pp. 60 to 147.

* cited by examiner

DIECUT ESPECIALLY FOR PERMANENTLY CLOSING HOLES

The present invention relates to a diecut especially for the permanent closing of holes which are located preferably in metal sheets or in plastics parts of, in particular, vehicles, and also to a method for permanently closing holes.

In the fabrication of relatively complex structures from metal sheets and/or plastics, constructional dictates make it impossible to avoid having to cut holes in the sheets or plastics, in order to gain access to cavities situated behind them, whether for the purpose of painting or for the purpose of welding.

When the desired operation has been concluded, these holes are usually no longer needed, and are often in fact disruptive, since they allow the passage of air, atmospheric moisture or water into the structure, which may lead, for example, to processes of oxidation (rust).

One simple solution to avoiding these problems is to close the holes again after use.

Particularly in the production of modern vehicles such as watercraft, land vehicles (trucks, automobiles, etc.), air vehicles, space vehicles, and combinations thereof, such as amphibious vehicles, for example, it is inevitable that during assembly, in numerous individual parts made from metal sheets or plastics, holes of different sizes are required. The hole diameters are typically between 5 and 50 mm. In subsequent operation, many of these holes must be given airtight and in particular watertight closure again, in order to prevent said corrosive attacks.

Another requirement is to achieve a considerable improvement in the sound proofing of the passenger interior through the closing of the holes.

The problems underlying the invention, and also the solution to these problems, are described below using the body of a car as an example. This expressly does not restrict the concept of the invention to this utility. This utility is part of the technical field in which the invention is manifested to particular advantage.

If from this point on there is reference to use in a vehicle body, the skilled person reads this as embracing all other possible utilities as well as a vehicle body.

In automotive construction, holes must be made, or punched out, at various locations in the vehicle body. Generally this is done as part of the operation of punching and forming the individual sheet-metal or aluminum parts; additionally, holes may also be drilled in plastics components. Subsequently, by means of a variety of joining processes, the individual metal parts are connected with one another, and the bodyshell is formed. The uses of the holes, openings or passages in this bodyshell include their use as paint drainage holes (for cathodic electrocoat materials, for example), wax injection holes, wax drainage holes, holes for later screw-mounting operations in assembly, or for cable passages. After the cathodic electrocoat material has dried, many of these holes must be closed again, or else must be closed after the final clearcoat operation (in which case hole closure would take place in the assembly process).

There are many possible reasons why a hole needs to be closed, examples being:
  moisture
  acoustics
  corrosion prevention.

Generally speaking, the holes or openings are closed using injection-molded parts (plugs) made from different plastics manufactured according to the profile of requirements. These may be, for example, plugs made from PET, ABS, PP, PVC, EPDM, PA and further commercial plastics, or else combinations of the stated materials and customary commercial polymeric substrates not listed here. Also in use are materials which possess a glass fiber fraction; also conceivable are carbon fibers, which strengthen the plug against being pushed through, for example. In principle all common polymeric substrates are possible, provided that they offer particular parameters in relation to paintability, temperature stability, dimensional stability under climatic conditions, and also fulfill a certain economy in the plug manufacturing process.

At the present time, vehicle bodywork holes are generally closed using plastic plugs which on the one hand, in a particular scenario, do not securely close the hole, and on the other hand are comparatively complicated and expensive to produce.

Each size of hole requires a specific plug adapted to the hole size. This entails high logistical and administrative effort for the consumer of the plugs.

On the production line it is necessary accordingly to hold a large number of plugs of different sizes in individually assigned storage crates.

Also suitable for this purpose are adhesive tapes, which are cut to length or die-cut in accordance with the hole size. Adhesive tapes as well, however, do not always meet the increasingly high requirements of the market.

The intention here is to look more closely at the self-adhesive hole closures which are required to achieve an acoustic effect.

These acoustically relevant hole closures are often used in assembly in order to obtain an isolated region, the vehicle interior, within the passenger cell. Disruptive acoustics in the vehicle interior are generated, for example, by rolling noises from the tires or else by loose gravel and also small chippings which are thrown against the vehicle paneling and also against the vehicle's structural members. Moreover, wind noises which come about as a result of unstreamlined design are another possible cause of a relatively high, unwanted noise level within the passenger cell.

The noise caused by loose gravel, chippings, rolling noises from the tires, and by unevenesses in the ground is often transmitted into the cavities in the structural member systems (side and crossmembers) and into the vehicle interior or passenger cell. As a result of this, products with acoustic activity must also be employed outside the vehicle. One form of effective acoustic protection, for example, is to tape off holes in the floor assembly and/or in the vehicle platform. Holes, punched apertures or drilled apertures are often made in the side and crossmembers. Here, particular attention must be paid to carefully closing every possible opening.

As already described, numerous holes in the sheet-metal bodywork parts, or in the structural member systems, serve to allow the cathodic electrocoat material to drain as rapidly as possible from the body and from all kinds of cavities, in order to secure operating time. This means, conversely, that the openings and holes must be reliably closed immediately downstream of the cathodic electrocoat drier. Generally, this is done on what is called the PVC line. This area involves a manufacturing step which takes place before application of primer-surfacer or before application of basecoat material. A further feature to be fulfilled, therefore, is that of repaintability for products which are employed within this production segment. Moreover, there must be compatibility with PVC seam-sealing material, since gaps are sealed with pumpable PVC compounds between the cathodic electrocoat drier and the next coating layer.

Hole closure products based on heavy-duty film in combination with a film applied to the top side are known from EP 3 036 100 A1. Disclosed therein is a diecut especially for the permanent closing of holes, particularly in metal sheets or in plastics parts, having a carrier comprising a laminate of at least two polymeric films, the lower film having a basis weight of at least 1.5 kg/m², more particularly between 1.5 and 6 kg/m², and the side of the lower film opposite the upper film bearing an applied adhesive, more particularly a curable or self-adhesive composition. The upper film consists preferably of polyester, more preferably of polyethylene terephthalate (PET).

Besides the conventional vehicles with internal combustion engines, hybrid electric-powered vehicles (HEV for Hybrid Electric Vehicle) and electric automobiles with batteries (BEV for Battery Electric Vehicle) are increasingly gaining importance.

A hybrid electric vehicle is a vehicle with a hybrid drive, in other words an electric vehicle which is driven by at least one electric motor and also by a further energy convertor, and which draws energy both from its electrical accumulator (battery) and from a fuel carried additionally. A fully electric vehicle is driven exclusively by a battery-operated electric motor and therefore requires no fossil fuel. The battery is charged via external network components.

A problem with these vehicles is the batteries located in the body, such as lithium-ion batteries. A burning lithium-ion battery is much more difficult to extinguish than a burning petrol or diesel vehicle.

Consequently, there is also a continual increase in the safety requirements governing batteries in electric automobiles. The OEMs are attempting with maximum assurance to respond to the requirements by preventing the spread of fire from the battery compartment into the vehicle through, for example, the holes in the bodywork. Because the requirements with regard to flame temperatures and also to time to penetration are not precisely stipulated, the solutions employed are primarily those which cover maximum possible temperature ranges and time spans.

Initial products are available with the capacity to meet the exacting requirements imposed. For example, Tesa® 54332 from tesa SE combines an extremely heat-resistant carrier composed of aluminum and woven glass fiber fabric with an extra-thick acrylate adhesive. The product is optimized for utilities in car making, in order to close unused bodywork apertures, where excellent heat resistance and flawless sealing are required. This product withstands a horizontal fire test at temperatures up to 500° C. for at least 5 minutes. The test determines the time to penetration of the flame at the respective temperature. The construction and the implementation of the fire test are described in detail later on below.

GTR 20 (Global Technical Regulation No. 20) in the version of 3 May 2018 lays down the requirements currently imposed on BEVs in respect, for example, of fire protection in the battery packs. The OEMs/OESs are attempting to provide maximum fire resistance to surrounding components as well (for example diecut parts in the underbody).

One of the main applications of expandable graphite is in flame retardation. Expandable graphite is produced from the naturally occurring mineral graphite. A graphite flake consists of layers of carbon atoms in a honeycomb-like arrangement. The atoms are connected very firmly within the layers by covalent bonds. The bonding forces between the layers are weak, allowing molecules to be incorporated (intercalated) between the graphite layers. This produces what is referred to as expandable salt or graphite intercalation compound (GIC). The incorporation of acids, typically sulfuric acid, converts graphite into expandable graphite.

When expandable graphite is heated, the graphite flakes expand according to grade, from a temperature of around 140° C., to a multiple of the original volume. Evaporation of the incorporated compounds drives the graphite layers apart in the manner of a concertina. The expanded flakes have a wormlike appearance and are typically several millimeters in length.

Physical properties of expandable graphite:

| Carbon content | 85% to 99% |
|---|---|
| Expansion rate | 30 to 400 cm³/g |
| Particle size | 80% < 75 μm to 80% > 500 μm |
| Start temperature | 140 to 230° C. |

On exposure to heat, the graphite layers are driven apart in the manner of a concertina by thermal salts, and the graphite flakes expand. Given free expansion, the final volume can reach 100 to 500 times the starting volume. The properties of the expandable graphite, i.e., starting temperature and expansion, are determined primarily by the amount and agent of intercalation and also by the graphite particle size (constitution).

It is an object of the invention to provide a diecut which is suitable for permanently closing holes, especially in metal sheets or in plastics parts of car bodies, and which closes said holes such that moisture penetration is impossible, which can be repainted with at least some of the customary paints, which enhances soundproofing and provides reliable sealing with respect to mechanical exposures in the interior, particularly in the floor area, and which offers an improvement in the resistance to heat and fire.

This object is achieved by means of a diecut as specified in the main claim. The dependent claims provide advantageous onward developments of the subject matter of the invention.

The invention accordingly provides a diecut especially for the permanent closing of holes especially in metal sheets or in plastics parts, having a carrier composed of an assembly, more particularly laminate in the specified layer sequence, of optionally at least one first layer, which is formed by a metallic layer having a thickness of 10 to 40 μm, optionally at least one second layer, which is formed by a woven glass fabric or laid glass fabric having a basis weight of 30 to 200 g/m², optionally at least one third layer, which is formed by a first pressure-sensitive adhesive having a basis weight of 70 to 200 g/m², at least one fourth layer, which is formed by an unexpanded expandable graphite having a thickness of at least 0.2 to 3.0 mm, the expandable graphite being present in the layer to an extent of at least 80 wt %, and at least one fifth layer, which is formed by a second pressure-sensitive adhesive having a basis weight of 300 to 1800 g/m², preferably 360 to 1500 g/m² and/or a thickness of 400 to 1800 μm, preferably 800 to 1500 μm.

A preferred embodiment of the diecut is that wherein at least the first, second, third, fourth and fifth layers are present simultaneously.

According to one advantageous embodiment of the invention, the first metallic layer has a thickness of 12 to 20 μm, more preferably 18 μm. It may also feature embossing.

Metals selectable include silver, copper, gold, platinum, aluminum and aluminum compounds, tin, nichrome, Nirosta, titanium, and metal oxides such as cadmium oxides, tin oxides, zinc oxides and magnesium oxides. Selected with particular preference is aluminum. This recitation should not be considered here to be exhaustive; instead, the skilled person is able to select further metal layers, not explicitly stated here, without departing from the concept of the invention. The metallic layer preferably comprises a rolled metal foil, more particularly aluminum foil.

With further advantage, in accordance with the invention, the first metallic layer used may comprise layers of metal oxide (MeOx layers). Advantageous metal oxide layers consist, for example, of silicon dioxide ($SiO_2$), titanium dioxide ($TiO_2$) or zinc tin oxide (ZnSnO), or comprise one or more of these metal oxides.

The woven or laid glass fabric of the second layer advantageously has properties as follows:

The basis weight is between 60 and 120 $g/m^2$, more particularly between 70 and 100 $g/m^2$, further in particular between 80 and 90 $g/m^2$.

The warp thread count and/or the weft thread count are/is in each case 3 to 50 threads/cm.

According to another advantageous embodiment of the invention, the warp thread count is 5 to 10/cm, preferably 7/cm and/or the weft thread count is 4 to 10/cm, preferably 5/cm.

The thread weight of the longitudinal and transverse threads is preferably between 500 to 1000 dtex, more preferably between 600 and 800 dtex, with particular preference 680 dtex.

The transverse titer is the term used for the number of transverse threads (weft threads) per centimeter, multiplied by the thread weight of the transverse threads in dtex. The unit is dtex/cm.

The longitudinal titer is the term used for the number of longitudinal threads (warp threads) per centimeter, multiplied by the thread weight of the longitudinal threads in dtex. The unit is again dtex/cm.

According to another advantageous embodiment of the invention, the longitudinal titer of the longitudinal threads and/or the transverse titer of the transverse threads is greater than 2000 dtex/cm. With preference the longitudinal titer is between 4000 and 5000 dtex/cm and/or the transverse titer is between 3000 and 4000 dtex/cm.

In a woven glass fabric, the threads are woven in a plain weave. Other types of weave are sateen (also known as satin, of which there are regular and irregular forms) and twill. A twill weave (for example a "2 over 1 twill") generates what is called a twill line, which runs diagonally to the machine direction.

A laid fabric is a sheetlike structure consisting of one or more plies of stretched threads running in parallel. The threads are typically fixed at the points where they cross. Fixing is accomplished either by cohesive bonding or mechanically by friction and/or interlocking.

The following types of laid-filament fabrics are in existence:
- monoaxial or unidirectional fabrics, formed by the fixing of one group of parallel threads
- biaxial fabrics, in which two groups of parallel threads are fixed in the direction of two axes
- multiaxial fabrics: a plurality of groups of parallel threads are fixed in the direction of different axes.

The plies of threads in the case of multi-ply laid fabrics may all have different orientations, and may also consist of different thread densities, including different linear densities.

Preferred in the invention are single-ply laid fabrics.

Between the first metallic layer and the second layer in the form of a woven or laid glass fabric there may be functional layers such as, for instance, adhesion promoters for improving the composite adhesion. Preference is given to using a further adhesive layer in the form of a laminating adhesive, specifically having a unit area coat weight of 5 to 50 $g/m^2$, more particularly of 7 to 20 $g/m^2$.

Suitable laminating adhesives include, in particular, pressure-sensitive adhesives, as elucidated comprehensively below.

An alternative possibility is for the first metallic layer and the second layer in the form of a woven or laid glass fabric to be joined together by lamination under pressure.

Further preferably, the woven glass fabric or laid glass fabric is located in a polymer layer, for example a polyurethane-based polymer layer, specifically such that all filaments of the woven glass fabric or laid glass fabric are surrounded as completely as possible by the polymer. Preferably, to this end the woven glass fabric or laid glass fabric is introduced into the still viscous polymer such that the polymer flows around the woven glass fabric or laid glass fabric, or the polymer is poured over the woven glass fabric or laid glass fabric such that the polymer flows around the woven glass fabric or laid glass fabric.

For the third layer, which is formed by a first pressure-sensitive adhesive having a basis weight of 70 to 200 $g/m^2$, all known adhesive systems may be employed. As well as adhesives based on natural or synthetic rubber, silicone adhesives and also polyacrylate adhesives in particular may be used.

The adhesive is preferably a pressure-sensitive adhesive (PSA), this being an adhesive which even under relatively weak applied pressure permits a durable bond to virtually all substrates and which after use can be detached from the substrate again substantially without residue. A pressure-sensitive adhesive is permanently tacky at room temperature, thus having a sufficiently low viscosity and a high initial tack, so that it wets the surface of the respective substrate even at low applied pressure. The bondability of the adhesive derives from its adhesive properties, and the redetachability from its cohesive properties.

PSAs may be regarded as liquids of extremely high viscosity with an elastic component. Accordingly, they have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure and the degree of crosslinking of the respective PSA but also on the rate and duration of the deformation, and on the temperature.

The proportional viscous flow is necessary for the achievement of adhesion. Only the viscous components, brought about by macromolecules with relatively high mobility, permit effective wetting and effective flow onto the substrate to be bonded. A high viscous flow component results in high pressure-sensitive adhesiveness (also referred to as tack or surface tackiness) and hence often also in a high peel adhesion. Owing to a lack of flowable components, generally speaking, highly crosslinked systems and polymers which are crystalline or have undergone glasslike solidification have at least only a little tack, or none at all.

The proportional elastic forces of resilience are necessary for the attainment of cohesion. They are brought about, for example, by very long-chain macromolecules with a high degree of coiling, and also by physically or chemically crosslinked macromolecules, and they allow the transmission of the forces that act on an adhesive bond. As a result of these forces of resilience, an adhesive bond is able to withstand a long-term load acting on it, in the form of a long-term shearing load, for example, sufficiently over a relatively long period.

It is possible here to employ all known adhesive systems. Besides natural or synthetic rubber-based adhesives there are, in particular, silicone adhesives and also polyacrylate adhesives, preferably a low molecular mass acrylate hotmelt pressure-sensitive adhesive, that can be used.

Preferred adhesives are those based on acrylate or silicone.

The adhesive may be selected from the group of the natural rubbers or the synthetic rubbers, or from any desired blend of natural rubbers and/or synthetic rubbers, with the natural rubber or rubbers being selectable in principle from all available grades such as, for example, crepe, RSS, ADS, TSR or CV products, depending on the required level of purity and of viscosity, and the synthetic rubber or rubbers being selectable from the group of the randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes and/or blends thereof.

Likewise, preferably the adhesive coating consists of an adhesive based on synthetic rubber, more particularly an adhesive composed of at least one vinyl aromatic block copolymer and at least one tackifier resin. Typical concentrations for use of the block copolymer lie at a concentration in the range between 30 wt % and 70 wt %, more particularly in the range between 35 wt % and 55 wt %.

Further polymers present may be those based on pure hydrocarbon atoms such as, for example, unsaturated polydienes such as natural or synthetically generated polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalized hydrocarbon atoms such as, for example, halogen-containing, acrylate-containing or vinyl ether-containing polyolefins, which may replace up to half of the vinyl aromatic-containing block copolymers.

Serving as tackifiers are tackifier resins which are compatible with the elastomer block of the styrene block copolymers.

Plasticizing agents such as, for example, liquid resins, plasticizer oils or low molecular mass liquid polymers such as, for example, low molecular mass polyisobutylenes having molar masses <1500 g/mol (number average) or liquid EPDM products are typically employed.

Further additives possibly added to all stated types of adhesives include light stabilizers such as, for example, UV absorbers, sterically hindered amines, antiozonants, metal deactivators, processing aids, endblock-reinforcing resins.

Fillers such as, for example, silicon dioxide, glass (ground or in the form of beads, as solid or hollow beads), microballoons, aluminum oxides, zinc oxides, calcium carbonates, titanium dioxides, carbon blacks, silicates and chalk, to name but a few, and also color pigments and dyes, and optical brighteners as well, may likewise be used.

PSAs are typically admixed with primary and secondary antioxidants in order to improve their aging stability. Primary antioxidants react with oxy and peroxy radicals, which can form in the presence of oxygen, and react with them to form less reactive compounds. Secondary antioxidants reduce hydroperoxides to alcohols, for example. There is known to be a synergistic effect between primary and secondary aging inhibitors, and so the protective effect of a mixture is frequently greater than the sum of the two individual effects.

With further preference the rubbers may have their processing qualities enhanced by admixing of thermoplastic elastomers with a weight fraction of 10 to 50 wt %, this figure being based on the overall elastomer fraction.

Representatives that may be mentioned at this point include in particular the especially compatible styrene-isoprene-styrene (SIS) and styrene-butadiene-styrene (SBS) products. Suitable elastomers for blending are also, for example, EPDM or EPM rubber, polyisobutylene, butyl rubber, ethylene-vinyl acetate, hydrogenated block copolymers made from dienes (for example by hydrogenation of SBR, cSBR, BAN, NBR, SBS, SIS or IR; such polymers are known in the form of SEPS and SEBS, for example), or acrylate copolymers such as ACM.

In addition, a 100% system based on styrene-isoprene-styrene (SIS) has been found to be suitable.

Crosslinking is advantageous for improving the removability of the adhesive tape after use, and may be accomplished thermally or by irradiation with UV light or electron beams.

For the purpose of the thermally induced chemical crosslinking it is possible to use all known, thermally activatable chemical crosslinkers such as accelerated sulfur or sulfur donor systems, isocyanate systems, reactive melamine, formaldehyde and (optionally halogenated) phenol-formaldehyde resins and/or reactive phenolic resin or diisocyanate crosslinking systems with the corresponding activators, epoxidized polyester resins and acrylate resins, and also combinations of these.

The crosslinkers are activated preferably at temperatures above 50° C., more particularly at temperatures of 100° C. to 160° C., very preferably at temperatures of 110° C. to 140° C.

The thermal excitation of the crosslinkers may also be accomplished by means of IR rays or high-energy alternating fields.

Solvent-based or aqueously-based adhesives may be used, or else adhesives in the form of a hotmelt system. An acrylate hotmelt-based adhesive is suitable as well, and may have a K value of at least 20, more particularly greater than 30, obtainable by concentrating a solution of such an adhesive to form a system which can be processed as a hotmelt.

Concentration may take place in appropriately equipped tanks or extruders; especially in the case of accompanying degassing, a devolatilizing extruder is preferred.

One adhesive of this kind is set out in DE 43 13 008 A1, the content of which is hereby referenced and made part of the present disclosure and invention.

The acrylate hotmelt-based adhesive may also be chemically crosslinked, however.

The K value here is determined in particular in analogy to DIN 53 726.

In addition, further volatile constituents are removed in the process. After having been coated from the melt, these compositions retain only small fractions of volatile constituents. It is therefore possible to adopt all of the monomers/formulas claimed in the patent indicated above.

The solution of the composition may have a solvent content of 5 to 80 wt %, more particularly 30 to 70 wt %.

Commercial solvents are preferably used, being, in particular, low-boiling hydrocarbon atoms, ketones, alcohols and/or esters.

Further preference is given to using single-screw, twin-screw or multi-screw extruders with one or more particularly with two or more venting units.

The acrylate hotmelt-based adhesive may have benzoin derivatives copolymerized in it, as for example benzoin acrylate or benzoin methacrylate, acrylic or methacrylic esters. Such benzoin derivatives are described in EP 0 578 151 A.

The acrylate hotmelt-based adhesive may be UV-crosslinked. Other forms of crosslinking are also possible though, with electron beam crosslinking being an example.

In a further preferred embodiment, self-adhesive compositions used are copolymers of (meth)acrylic acid and esters thereof having 1 to 25 carbon atoms, maleic, fumaric and/or itaconic acid and/or their esters, substituted (meth)acrylamides, maleic anhydride and other vinyl compounds, such as vinyl esters, especially vinyl acetate, vinyl alcohols and/or vinyl ethers.

One adhesive which has likewise shown itself to be suitable is a low molecular mass acrylate hotmelt pressure-sensitive adhesive, as carried by BASF under the designation acResin UV or Acronal®, more particularly Acronal® DS 3458 or AC Resin A 260UV. This low K value adhesive acquires its application-matched properties by virtue of a concluding crosslinking procedure initiated chemically by radiation.

Other outstandingly suitable adhesives are described in EP 2 520 627 A1, EP 2 522 705 A1, EP 2 520 628 A1, EP 2 695 926 A1 and EP 2 520 629 A1.

Particularly preferred is a PSA in the form of a dried polymer dispersion, the polymer being composed of:
(a) 95.0 to 100.0 wt % of n-butyl acrylate and/or 2-ethylhexyl acrylate
(b) 0.0 to 5.0 wt % of an ethylenically unsaturated monomer having an acid or acid anhydride function.

The polymer consists preferably of 95.0 to 99.5 wt % of n-butyl acrylate and/or 2-ethylhexyl acrylate and 0.5 to 5 wt % of an ethylenically unsaturated monomer having an acid or acid anhydride function, more preferably of 97.0 or 98.0 wt % to 99.0 wt % of n-butyl acrylate and/or 2-ethylhexyl acrylate and 1.0 to 2.0 wt % or 3 wt % of an ethylenically unsaturated monomer having an acid or acid anhydride function.

Besides the acrylate polymers recited, and besides any residual monomers present, the PSA may additionally be admixed with tackifiers and/or adjuvants such as light stabilizers or aging inhibitors.

In particular there are no further polymers such as elastomers present in the PSA, meaning that the polymers of the PSA consist only of the monomers (a) and (b) in the proportions indicated.

Monomer (a) is preferably formed by n-butyl acrylate.

Examples of monomers contemplated as (b) advantageously include acrylic acid, methacrylic acid, itaconic acid, maleic acid, fumaric acid and/or maleic anhydride. Preferred is (meth)acrylic acid of the formula I,

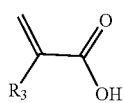
(I)

where $R^3$ is =H or $CH_3$, preference is given optionally to using the mixture of acrylic acid or methacrylic acid. Acrylic acid is particularly preferred.

According to one particularly preferred variant, the composition of the polymer is as follows:
(a) 95.0 to 100.0 wt %, preferably 95.0 to 99.5 wt %, more preferably 98.0 to 99.0 wt % of n-butyl acrylate and
(b) 0.0 to 5.0 wt %, preferably 0.5 to 5.0 wt %, more preferably 1.0 to 2.0 wt % of acrylic acid.

The polymer dispersion is prepared by the process of emulsion polymerization of the stated components. Descriptions of this process can be found for example in "Emulsion Polymerization and Emulsion Polymers" by Peter A. Lovell and Mohamed S. El-Aasser-Wiley-VCH 1997-ISBN 0-471-96746-7 or in EP 1 378 527 B1.

During the polymerization it is not impossible for not all of the monomers to undergo reaction to form polymers. It is obvious here that the residual monomer content is to be as small as possible.

Preference is given to providing adhesives comprising the polymer dispersion with a residual monomer content of less than or equal to 1 wt %, more particularly less than or equal to 0.5 wt % (based on the mass of the dried polymer dispersion).

Lastly it may be mentioned that polyurethane-based adhesives are also suitable.

To optimize the properties, it is possible for the self-adhesive composition employed to have been blended with one or more additives such as tackifiers (resins), plasticizers, fillers, pigments, UV absorbers, light stabilizers, aging inhibitors, crosslinking agents, crosslinking promoters or elastomers.

Tackifiers used are those resins already comprehensively described.

Examples of suitable fillers and pigments are carbon black, titanium dioxide, calcium carbonate, zinc carbonate, zinc oxide, silicates or silica.

Suitable plasticizers are, for example, aliphatic, cycloaliphatic and aromatic mineral oils, diesters or polyesters of phthalic acid, trimellitic acid or adipic acid, liquid rubbers (for example nitrile rubbers or polyisoprene rubbers), liquid polymers of butene and/or isobutene, acrylic esters, polyvinyl ethers, liquid resins and plasticizing resins based on the raw materials for tackifier resins, wool wax and other waxes, or liquid silicones.

Crosslinking agents are, for example, phenolic resins or halogenated phenolic resins, melamine and formaldehyde resins. Suitable crosslinking promoters are, for example, maleimides, allyl esters such as triallyl cyanurate, and polyfunctional esters of acrylic and methacrylic acid.

A "tackifier resin" is, in accordance with the general understanding of the skilled person, an oligomeric or polymeric resin which raises the autoadhesion (the tack, the inherent stickiness) of the PSA by comparison with the otherwise identical PSA containing no tackifier resin.

The use of tackifiers for boosting the peel adhesion values of PSAs is known fundamentally. This effect also comes about if the adhesive is admixed with up to 15 parts by weight (corresponding to <15 parts by weight), or 5 to 15 parts by weight, of tackifiers (based on the mass of the dried polymer dispersion). Preference is given to adding 5 to 12, more preferably 6 to 10 parts by weight of tackifiers (based on the mass of the dried polymer dispersion).

Suitable tackifiers, also referred to as tackifier resins, are in principle all known classes of compound. Tackifiers are, for example, hydrocarbon resins (for example polymers based on unsaturated $C_5$ or $C_9$ monomers), terpene-phenolic resins, polyterpene resins based on raw materials such as, for example, α- or β-pinene, aromatic resins such as coumarone-indene resins or resins based on styrene or α-methylstyrene such as rosin and its derivatives, examples being disproportionated, dimerized or esterified rosin, as for example reaction products with glycol, glycerol or pentaerythritol, to name but some. Preferred resins are those without readily oxidizable double bonds such as terpene-phenolic resins, aromatic resins and more preferably resins prepared by hydrogenation such as, for example, hydrogenated aromatic resins, hydrogenated polycyclopentadiene resins, hydrogenated rosin derivatives or hydrogenated polyterpene resins.

Preferred resins are those based on terpene phenols and rosin esters. Likewise preferred are tackifier resins having an ASTM E28-99 (2009) softening point of more than 80° C. Particularly preferred resins are those based on terpene phenols and rosin esters having an ASTM E28-99 (2009) softening point of more than 90° C. The resins are used advantageously in dispersion form. In that form they can readily be subjected to finely divided mixing with the polymer dispersion.

In a particularly preferred variant, no tackifier resins at all have been added to the PSA.

Not added to the PSA in particular are the following substances:
- hydrocarbon resins (for example polymers based on unsaturated $C_5$ or $C_9$ monomers)
- terpene-phenolic resins
- polyterpene resins based on raw materials such as α- or β-pinene, for example
- aromatic resins such as coumarone-indene resins or resins based on styrene or α-methylstyrene such as rosin and its derivatives, as for example disproportionated, dimerized or esterified rosin, examples being reaction products with glycol, glycerol or pentaerythritol.

A "poly(meth)acrylate" is a polymer of which at least 60 wt % of its monomer basis consists of acrylic acid, methacrylic acid, acrylic esters and/or methacrylic esters, with acrylic esters and/or methacrylic esters being included at least proportionally, preferably at not less than 50 wt %, based on the overall monomer basis of the polymer in question. More particularly a "poly(meth)acrylate" is a polymer which is obtainable by radical polymerization of acrylic and/or methacrylic monomers and also, optionally, further, copolymerizable monomers.

In the invention the poly(meth)acrylate or poly(meth)acrylates is or are present at 30 to 65 wt %, based on the total weight of the PSA. The PSA of the invention comprises preferably 35 to 55 wt % of at least one poly(meth)acrylate, based on the total weight of the PSA.

The glass transition temperature of the poly(meth)acrylates which can be used in the invention is preferably <0° C., more preferably between −20 and −50° C.

The glass transition temperature of polymers or of polymer blocks in block copolymers is determined for the purposes of this invention by dynamic scanning calorimetry (DSC).

The poly(meth)acrylates of the PSA of the invention are obtainable preferably by at least proportional copolymerization of functional monomers which preferably are crosslinkable with epoxide groups. These monomers are more preferably those with acid groups (particularly carboxylic, sulfonic or phosphonic acid groups) and/or hydroxyl groups and/or acid anhydride groups and/or epoxide groups and/or amine groups; especially preferred are monomers containing carboxylic acid groups. It is particularly advantageous for the polyacrylate to contain copolymerized acrylic acid and/or methacrylic acid. All of these groups feature crosslinkability with epoxide groups, thereby making the polyacrylate amenable advantageously to thermal crosslinking with introduced epoxides.

Other monomers which may be used as comonomers for the poly(meth)acrylates, aside from acrylic and methacrylic esters having up to 30 carbon atoms per molecule, are, for example, vinyl esters of carboxylic acids containing up to 20 carbon atoms, vinyl aromatics having up to 20 carbon atoms, ethylenically unsaturated nitriles, vinyl halides, vinyl ethers of alcohols containing 1 to 10 carbon atoms, aliphatic hydrocarbon atoms having 2 to 8 carbon atoms and one or two double bonds, or mixtures of these monomers.

The properties of the poly(meth)acrylate in question may be influenced in particular by variation in the glass transition temperature of the polymer through different weight fractions of the individual monomers. The poly(meth)acrylate(s) of the invention may derive preferably from the following monomer composition:

a) acrylic esters and/or methacrylic esters of the following formula

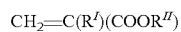

where $R^I$ is =H or $CH_3$ and $R^{II}$ is an alkyl radical having 4 to 14 carbon atoms, b) olefinically unsaturated monomers having functional groups of the kind already defined for reactivity with epoxide groups, c) optionally further acrylates and/or methacrylates and/or olefinically unsaturated monomers which are copolymerizable with component (a).

The fractions of the corresponding components (a), (b) and (c) are preferably selected such that the polymerization product has a glass transition temperature of <0° C., more preferably between −20 and −50° C. (DSC). It is particularly advantageous to select the monomers of component (a) with a fraction of 45 to 99 wt %, the monomers of component (b) with a fraction of 1 to 15 wt % and the monomers of component (c) with a fraction of 0 to 40 wt % (the figures are based on the monomer mixture for the "basic polymer", in other words without additions of any additives to the completed polymer, such as resins, etc.).

The monomers of component (a) are more particularly plasticizing and/or non-polar monomers. Used preferably as monomers (a) are acrylic and methacrylic esters having alkyl groups consisting of 4 to 14 carbon atoms, more preferably 4 to 9 carbon atoms. Examples of such monomers are n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate and their branched isomers, such as, for example, isobutyl acrylate, isooctyl acrylate, isooctyl methacrylate, 2-ethylhexyl acrylate or 2-ethylhexyl methacrylate.

The monomers of component (b) are more particularly olefinically unsaturated monomers having functional groups, especially having functional groups able to enter into a reaction with epoxide groups.

Used preferably for component (b) are monomers having functional groups selected from the group encompassing the following: hydroxyl, carboxyl, sulfonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinyl acetic acid, vinyl phosphonic acid, maleic anhydride, hydroxyethyl acrylate, especially 2-hydroxyethyl acrylate, hydroxypropyl acrylate, especially 3-hydroxypropyl acrylate, hydroxybutyl acrylate, especially 4-hydroxybutyl acrylate, hydroxyhexyl acrylate, especially 6-hydroxyhexyl acrylate, hydroxyethyl methacrylate, especially 2-hydroxyethyl methacrylate, hydroxypropyl methacrylate, especially 3-hydroxypropyl methacrylate, hydroxybutyl methacrylate, especially 4-hydroxybutyl methacrylate, hydroxyhexyl methacrylate, especially 6-hydroxyhexyl methacrylate, allyl alcohol, glycidyl acrylate, glycidyl methacrylate.

In principle it is possible as component (c) to use all vinylically functionalized compounds which are copolymerizable with component (a) and/or with component (b). The monomers of component (c) may serve to adjust the properties of the resultant PSA.

Illustrative monomers of component (c) are as follows: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethyl acrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (weight-average molecular weight Mw, determined by GPC, of 4000 to 13 000 g/mol), poly(methyl methacrylate)-ethyl methacrylate (Mw of 2000 to 8000 g/mol).

Monomers of component (c) may advantageously also be selected such that they include functional groups which support subsequent radiation-chemical crosslinking (by electron beams or UV, for example). Suitable copolymerizable photo initiators are, for example, benzoin acrylate and acrylate-functionalized benzophenone derivatives. Monomers which support crosslinking by electron bombardment are, for example, tetrahydrofurfuryl acrylate, N-tert-butylacrylamide and allyl acrylate.

The polyacrylates ("polyacrylates" are understood in the context of the invention to be synonymous with "poly(meth)acrylates") may be prepared by methods familiar to the skilled person, especially advantageously by conventional radical polymerizations or controlled radical polymerizations. The polyacrylates may be prepared by copolymerization of the monomeric components using the customary polymerization initiators and also, optionally, chain transfer agents, the polymerization being carried out at the customary temperatures in bulk, in emulsion, for example in water or liquid hydrocarbon atoms, or in solution.

The polyacrylates are prepared preferably by polymerization of the monomers in solvents, more particularly in solvents having a boiling range of 50 to 150° C., preferably of 60 to 120° C., using the customary amounts of polymerization initiators, which in general are 0.01 to 5, more particularly 0.1 to 2 wt %, based on the total weight of the monomers.

Suitable in principle are all customary initiators familiar to the skilled person. Examples of radical sources are peroxides, hydroperoxides and azo compounds, for example dibenzoyl peroxide, cumene hydroperoxide, cyclohexanone peroxide, di-t-butyl peroxide, cyclohexylsulfonyl acetyl peroxide, diisopropyl percarbonate, t-butyl peroctoate and benzopinacol. One very preferred procedure uses as radical initiator 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Suitable solvents for preparing the poly(meth)acrylates include alcohols such as methanol, ethanol, n- and isopropanol, n- and isobutanol, preferably isopropanol and/or isobutanol, and also hydrocarbon atoms such as toluene and, more particularly, mineral spirits with a boiling range from 60 to 120° C. Further possibilities for use include ketones such as preferably acetone, methyl ethyl ketone, methyl isobutyl ketone, and esters such as ethyl acetate, and also mixtures of solvents of the type stated, with preference being given to mixtures which comprise isopropanol, especially in amounts of 2 to 15 wt %, preferably 3 to 10 wt %, based on the solvent mixture employed.

The preparation (polymerization) of the polyacrylates is followed preferably by a concentration procedure, and the further processing of the polyacrylates takes place with substantial absence of solvent. The concentration of the polymer may be accomplished in the absence of crosslinker and accelerator substances. Also possible, however, is the addition of one of these classes of compound to the polymer even prior to the concentration, in which case concentration does take place in the presence of said substance(s).

The weight-average molecular weights Mw of the polyacrylates are preferably in a range from 20 000 to 2 000 000 g/mol, very preferably in a range from 100 000 to 1 500 000 g/mol, most preferably in a range from 150 000 to 1 000 000 g/mol. The figures for average molecular weight $M_w$ and for polydispersity PD in this text relate to the determination by gel permeation chromatography. For that purpose it may be advantageous to carry out the polymerization in the presence of suitable chain transfer agents such as thiols, halogen compounds and/or alcohols, in order to set the desired average molecular weight.

The polyacrylates preferably have a K value of 30 to 90, more preferably of 40 to 70, measured in toluene (1% strength solution, 21° C.). The K value according to Fikentscher is a measure of the molecular weight and viscosity of the polymer.

Particularly suitable in accordance with the invention are polyacrylates which have a narrow molecular weight distribution (polydispersity PD<4). These materials in spite of a relatively low molecular weight after crosslinking have a particularly good shear strength. The relatively low polydispersity also facilitates processing from the melt, since the flow viscosity is lower than for a broader-range polyacrylate while application properties are largely the same. Narrow-range poly(meth)acrylates can be prepared advantageously by anionic polymerization or by controlled radical polymerization methods, the latter being especially suitable. Via N-oxyls as well it is possible to prepare such polyacrylates. Furthermore, advantageously, Atom Transfer Radical Polymerization (ATRP) may be employed for the synthesis of narrow-range polyacrylates, the initiator used comprising preferably monofunctional or difunctional secondary or tertiary halides and the halide(s) being abstracted using complexes of Cu, Ni, Fe, Pd, Pt, Ru, Os, Rh, Co, Ir, Ag or Au.

The monomers for preparing the poly(meth)acrylates preferably include proportionally functional groups suitable for entering into linking reactions with epoxide groups. This advantageously permits thermal crosslinking of the polyacrylates by reaction with epoxides. Linking reactions are understood to be, in particular, addition reactions and substitution reactions. Preferably, therefore, there is a linking of the building blocks carrying the functional groups to building blocks carrying epoxide groups, more particularly in the sense of a crosslinking of the polymer building blocks carrying the functional groups via linking bridges comprising crosslinker molecules which carry epoxide groups. The substances containing epoxide groups are preferably polyfunctional epoxides, in other words those having at least two epoxide groups; accordingly, the overall result is preferably an indirect linking of the building blocks carrying the functional groups.

The poly(meth)acrylates of the PSA of the invention are crosslinked preferably by linking reactions—especially in the sense of addition reactions or substitution reactions—of functional groups they contain with thermal crosslinkers. All thermal crosslinkers may be used which not only ensure a sufficiently long processing life, meaning that there is no gelling during the processing operation, particularly the extrusion operation, but also lead to rapid postcrosslinking of the polymer to the desired degree of crosslinking at temperatures lower than the processing temperature, more particularly at room temperature. Possible for example is a combination of carboxyl-, amino- and/or hydroxyl-containing polymers and isocyanates, more particularly aliphatic or trimerized isocyanates deactivated with amines, as crosslinkers.

Suitable isocyanates are, more particularly, trimerized derivatives of MDI [4,4-methylenedi(phenyl isocyanate)], HDI [hexamethylene diisocyanate, 1,6-hexylene diisocyanate] and/or IPDI [isophorone diisocyanate, 5-isocyanato-1-isocyanatomethyl-1,3,3-trimethylcyclohexane], examples being the types Desmodur® N3600 and XP2410 (each BAYER AG: aliphatic polyisocyanates, low-viscosity HDI trimers). Likewise suitable is the surface-deactivated dispersion of micronized trimerized IPDI BUEJ 339®, now HF9® (BAYER AG).

Also suitable in principle for the crosslinking, however, are other isocyanates such as DesmodurVL 50 (MDI-based polyisocyanates, Bayer AG), Basonat F200WD (aliphatic polyisocyanate, BASF AG), Basonat HW100 (water-emulsifiable polyfunctional, HDI-based isocyanate, BASF AG), Basonat HA 300 (allophanate-modified polyisocyanate based on HDI isocyanurate, BASF) or Bayhydur VPLS2150/1 (hydrophilically modified IPDI, Bayer AG).

Preference is given to using thermal crosslinkers at 0.1 to 5 wt %, more particularly at 0.2 to 1 wt %, based on the total amount of the polymer to be crosslinked.

The poly(meth)acrylates of the PSA are crosslinked preferably by means of one or more epoxides or one or more substances containing epoxide groups. The substances containing epoxide groups are more particularly polyfunctional epoxides, in other words those having at least two epoxide groups; accordingly, the overall result is an indirect linking of the building blocks of the poly(meth)acrylates that carry the functional groups. The substances containing epoxide groups may be aromatic compounds and may be aliphatic compounds.

Outstandingly suitable polyfunctional epoxides are oligomers of epichlorohydrin, epoxy ethers of polyhydric alcohols (more particularly ethylene, propylene and butylene glycols, polyglycols, thiodiglycols, glycerol, pentaerythritol, sorbitol, polyvinyl alcohol, polyallyl alcohol and the like), epoxy ethers of polyhydric phenols[more particularly resorcinol, hydroquinone, bis(4-hydroxyphenyl) methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl) propane, 2,2-bis(4-hydroxy-3,5-dichlorophenyl)propane, bis(4-hydroxyphenyl)phenylmethane, bis(4-hydroxyphenyl) diphenylmethane, bis(4-hydroxyphenyl)-4'-methylphenylmethane, 1,1-bis(4-hydroxyphenyl)-2,2,2-trichloroethane, bis(4-hydroxyphenyl)(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulfone] and also their hydroxyethyl ethers, phenol-formaldehyde condensation products, such as phenol alcohols, phenol aldehyde resins and the like, S- and N-containing epoxides (for example N,N-diglycidylaniline, N,N'-dimethyldiglycidyl-4,4-dieminodiphenylmethane) and also epoxides prepared by customary methods from polyunsaturated carboxylic acids or monounsaturated carboxylic esters of unsaturated alcohols, glycidyl esters, polyglycidyl esters, which may be obtained by polymerization or copolymerization of glycidyl esters of unsaturated acids or are obtainable from other acidic compounds (cyanuric acid, diglycidyl sulfide, cyclic trimethylene trisulfone and/or derivatives thereof, and others).

Very suitable ethers are, for example, 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, bisphenol A diglycidyl ether and bisphenol F diglycidyl ether.

Particularly preferred for the poly(meth)acrylates as polymers to be crosslinked is the use of a crosslinker-accelerator system ("crosslinking system") described for example in EP 1 978 069 A1, in order to gain more effective control over not only the processing life and crosslinking kinetics but also the degree of crosslinking. The crosslinker-accelerator system comprises at least one substance containing epoxide groups, as crosslinker, and at least one substance which has an accelerating effect on crosslinking reactions by means of epoxide-functional compounds at a temperature below the melting temperature of the polymer to be crosslinked, as accelerator.

Accelerators used in accordance with the invention are more preferably amines (to be interpreted formally as substitution products of ammonia; in the formulae below, these substituents are represented by "R" and encompass in particular alkyl and/or aryl radicals and/or other organic radicals), more especially preferably those amines which enter into no reactions or only slight reactions with the building blocks of the polymers to be crosslinked.

Selectable in principle as accelerators are primary (NRH$_2$), secondary (NR$_2$H) and tertiary (NR$_3$) amines, and also of course those which have two or more primary and/or secondary and/or tertiary amine groups. Particularly preferred accelerators, however, are tertiary amines such as, for example, triethylamine, triethylenediamine, benzyldimethylamine, dimethylaminomethylphenol, 2,4,6-tris(N,N-dimethylaminomethyl)phenol and N,N'-bis(3-(dimethylamino)propyl)urea. As accelerators it is also possible with advantage to use polyfunctional amines such as diamines, triamines and/or tetramines. Outstandingly suitable are diethylenetriamine, triethylenetetramine and trimethylhexamethylenediamine, for example.

Used with preference as accelerators, furthermore, are amino alcohols. Particular preference is given to using secondary and/or tertiary amino alcohols, where in the case of two or more amine functionalities per molecule, preferably at least one, and preferably all, of the amine functionalities are secondary and/or tertiary. As preferred amino-alcohol accelerators it is possible to employ triethanolamine, N,N-bis(2-hydroxypropyl)ethanolamine, N-methyldiethanolamine, N-ethyldiethanolamine, 2-aminocyclohexanol, bis(2-hydroxycyclohexyl)methylamine, 2-(diisopropylamino)ethanol, 2-(dibutylamino)ethanol, N-butyldiethanolamine, N-butylethanolamine, 2-[bis(2-hydroxyethyl)amino]-2-(hydroxymethyl)-1,3-propanediol, 1-[bis(2-hydroxyethyl)amino]-2-propanol, triisopropanolamine, 2-(dimethylamino)ethanol, 2-(diethylamino)ethanol, 2-(2-dimethylaminoethoxy)ethanol, N,N,N'-trimethyl-N'-hydroxyethyl bisaminoethyl ether, N,N,N'-trimethylaminoethylethanolamine and/or N,N,N'-trimethylaminopropylethanolamine.

Other suitable accelerators are pyridine, imidazoles (such as, for example, 2-methylimidazole) and 1,8-diazabicyclo[5.4.0]undec-7-ene. Cycloaliphatic polyamines as well may be used as accelerators. Suitable also are phosphate-based accelerators such as phosphines and/or phosphonium compounds, such as triphenylphosphine or tetraphenylphosphonium tetraphenylborate, for example.

Acrylate PSAs are typically radically polymerized copolymers of alkyl esters of acrylic acid or alkyl esters of methacrylic acid with C1 to C20 alcohols such as, for example, methyl acrylate, ethyl (meth)acrylate, n-butyl (meth)acrylate, tert-butyl (meth)acrylate, cyclohexyl (meth)acrylate, 2-ethylhexyl (meth)acrylate, n-octyl (meth)acrylate, isooctyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth)acrylate, as well as other esters of (meth)acrylic acid such as isobornyl (meth)acrylate, benzyl (meth)acrylate, phenyl (meth)acrylate, and 2-bromoethyl (meth)acrylate, and alkoxyalkyl (meth)acrylates such as ethoxyethyl (meth)acrylate. Additionally included here are esters of ethylenically unsaturated dicarboxylic and tricarboxylic acids and anhydrides such as ethyl maleate, dimethyl fumarate, and ethyl methyl itaconate. Likewise included are vinylaromatic monomers such as, for example, styrene, vinyltoluene, methylstyrene, n-butylstyrene, and decylstyrene.

Further possible monomers are vinyl esters of carboxylic acids comprising up to 20 carbon atoms, such as vinyl acetate or vinyl laurate, vinyl ethers of alcohols comprising up to 10 carbon atoms, such as vinyl methyl ether or vinyl isobutyl ether, vinyl halides such as vinyl chloride or vinylidene dichloride, nitriles such as acrylonitrile or methacrylonitrile, acid amides such as acrylamide or methacrylamide, and unsaturated hydrocarbon atoms having 2 to 8 carbon atoms such as ethylene, propene, butadiene, isoprene, 1-hexene, or 1-octene.

Contemplated for the purpose of influencing the physical and optical properties of the PSA are polyfunctional, ethylenically unsaturated monomers as crosslinker monomers. Examples in this regard are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate, and tetraacrylates such as pentaerythritol tetraacrylate. Also included among the group of the polyfunctional monomers are UV-crosslinkable monomers, such as, for example, (meth)acrylate-functionalized derivatives of benzophenone or of benzoin.

Another group of monomers are those which generate a potential for latent crosslinking within the polymer and which, after the adhesive has dried, lead spontaneously (frequently with catalysis) to the construction of a network. An example of such a monomer is glycidyl methacrylate, whose oxirane ring leads to ring opening with hydroxyl functions or, in particular, with carboxylate functions and so to a covalent bond. This reaction takes place in accelerated form in the presence of zinc ions or—especially when carboxyl functions are present—of amines.

In order for pressure-sensitive adhesive properties to be obtained, the processing temperature of the adhesive must be above its glass transition temperature, in order to have viscoelastic properties.

Furthermore, acrylate-based activatable adhesives of the invention can be used. In that case, in one particularly preferred version, the activatable adhesives are constituted by a base polymer a) consisting of
  a1) 40 to 95 wt % of acrylic esters and/or methacrylic esters with the following formula

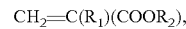
  CH$_2$=C(R$_1$)(COOR$_2$), where R$_1$ is =H or CH$_3$ and R$_2$ is =H and/or alkyl chains having 1 to 30 C atoms
  a2) 5 to 30 wt % of a copolymerizable vinyl monomer having at least one carboxylic acid and/or sulfonic acid and/or phosphonic acid group
  a3) 1 to 10 wt % of a copolymerizable vinyl monomer having at least one epoxy group or one acid anhydride function
  a4) 0 to 20 wt % of a copolymerizable vinyl monomer which with the functional group is able to contribute to boosted cohesion, to an increase in the reactivity of the crosslinking, or to the direct crosslinking, and b) 5 to 50 wt % of an epoxy resin or of a mixture of two or more epoxy resins.

The polymer a) may comprise an activatable PSA which becomes pressure-sensitively adhesive on exposure to temperature and, optionally, pressure, and which after bonding and cooling develops a high bond strength through solidification. Depending on application temperature, these activatable PSAs have different static glass transition temperatures $T_{g,A}$ or melting points $T_{m,A}$.

In one very preferred version, monomers used for the monomers a1) are acrylic monomers which comprise acrylic and methacrylic esters with alkyl groups consisting of 4 to 14 C atoms, preferably 4 to 9 C atoms. Specific examples, without wishing this enumeration to impose any restriction, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and the branched isomers thereof such as, for example, 2-ethylhexyl acrylate. Other classes of compound for use, which may likewise be added in minor amounts under a1), are methyl methacrylates, cyclohexyl methacrylates, isobornyl acrylate, and isobornyl methacrylates.

Used with preference as monomers a2) are itaconic acid, acrylic acid, methacrylic acid, vinylacetic acid, fumaric acid, crotonic acid, aconitic acid, dimethylacrylic acid, β-acryloyloxypropionic acid, trichloroacrylic acid, vinylphosphonic acid, and vinylsulfonic acid.

Used with preference as monomers a3) are glycidyl methacrylate, maleic anhydride, and itaconic anhydride.

One very preferred version uses, for the monomers a4), vinyl esters, vinyl ethers, vinyl halides, vinylidene halides, vinyl compounds with aromatic cycles and heterocycles in α-position. Here again, without exclusivity, a number of examples may be given: vinyl acetate, vinylformamide, vinylpyridine, ethyl vinyl ether, vinyl chloride, vinylidene chloride, and acrylonitrile.

One further very preferred version uses, for the monomers a4), monomers having the following functional groups: hydroxy, acid amide, isocyanato or amino groups.

Further particularly preferred examples for component a4) are hydroxyethyl acrylate, hydroxypropyl acrylate, hydroxyethyl methacrylate, hydroxypropyl methacrylate, allyl alcohol, acrylamide, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, tetrahydrofurfuryl acrylate, this enumeration not being conclusive.

In a further preferred version, use is made, for component a4), of aromatic vinyl compounds, in which case preferably the aromatic rings consist of $C_4$ to $C_{18}$ and may also include heteroatoms. Particularly preferred examples are styrene, 4-vinylpyridine, N-vinylphthalimide, methylstyrene, 3,4-dimethoxystyrene, 4-vinylbenzoic acid, this enumeration not being conclusive.

For the polymerization the monomers are selected in turn such that the resulting polymers can be used as industrially useful adhesives or PSAs, more particularly such that the resulting polymers have adhesive or pressure-sensitive adhesive properties in the sense of the "Handbook of Pressure Sensitive Adhesive Technology" by Donatas Satas (van Nostrand, New York 1989). Here as well the desired glass transition temperature can be controlled through the application of the Fox equation (E1) for the compilation of the monomer mixture on which the polymerization is based. For PSAs the static glass transition temperature of the resulting polymer is advantageously below 15° C.

In order to obtain a polymer glass transition temperature $T_{g,A}$ of 30° C. for heat-activatable adhesive, the monomers are very preferably selected, and the quantitative composition of the monomer mixture advantageously chosen, in accordance with the remarks above, in such a way as to give the desired $T_{g,A}$ value for the polymer in accordance with the Fox equation (E1) (cf. T. G. Fox, Bull. Am. Phys. Soc. 1 (1956) 123).

$$\frac{1}{T_g} = \sum_n \frac{w_n}{T_{g,n}} \tag{E1}$$

In this equation n represents the serial number of the monomers used, wn the mass fraction of the respective monomer n (wt %), and $T_{g,n}$ the respective glass transition temperature of the homopolymer of the respective monomers n in K.

For the preparation of the adhesives, advantageously, conventional radical polymerizations or controlled radical polymerizations are carried out. For the polymerizations proceeding by a radical route, preference is given to using initiator systems which further comprise other radical initiators for the polymerization, especially thermally decomposing radical-forming azo or peroxo initiators. Suitable in principle, however, are all of the initiators that are typical for acrylates and familiar to the skilled person. The production of C-centered radicals is described in Houben Weyl, Methoden der Organischen Chemie, Vol. E 19a, pages 60 to 147. These methods are preferentially employed analogously.

Examples of radical sources are peroxides, hydroperoxides, and azo compounds; certain nonexclusive examples of typical radical initiators may be given here as potassium peroxodisulfate, dibenzoyl peroxide, cumene hydroperoxide, cyclohexanone peroxide, di-tert-butyl peroxide, azodiisobutyronitrile, cyclohexylsulfonyl acetyl peroxide, diisopropyl percarbonate, tert-butyl peroctoate, and benzopinacol. One very preferred version uses 1,1'-azobis (cyclohexanecarbonitrile) (Vazo 88™ from DuPont) as radical initiator.

The average molecular weights Mn of the PSAs resulting from the radical polymerization are very preferably selected such that they are in a range from 20 000 to 2 000 000 g/mol; specifically for further use as pressure-sensitive hotmelt adhesives, PSAs are prepared that have average molecular weights Mn of 100 000 to 500 000 g/mol.

The polymerization can be conducted in bulk, in the presence of one or more organic solvents, in the presence of water, or in mixtures of organic solvents and water. The aim here is to minimize the amount of solvent used.

Depending on conversion and temperature, the polymerization time is between 4 and 72 hours. The higher the level at which it is possible to select the reaction temperature, in other words the higher the thermal stability of the reaction mixture, the lower the reaction time can be.

If low flammability is desirable, it can be achieved by adding flame retardants to the adhesive. These may be organic bromine compounds, as and when required with synergists such as antimony trioxide, although in relation to the absence of halogen from the adhesive tape, preference is giving to using red phosphorus, organophosphorous compounds, mineral compounds or intumescent compounds such as ammonium polyphosphate alone or in conjunction with synergists. A comprehensive description of suitable flame retardants is given later.

The adhesive coat weight is preferably between 80 and 160 g/m², more preferably between 90 and 100 g/m².

In order to increase the cohesion between the adhesive and the adjacent layer, the adhesive and/or the adjacent layer may be subjected to a corona treatment.

Primers as well may be used to improve the promotion of adhesion. Descriptions of the primers customarily used are found for example in "Handbook of Pressure Sensitive Adhesive Technology" by Donatas Satas (van Nostrand, 1989).

The fourth layer, which has a thickness of at least 0.2 to 3 mm, more preferably 0.5 to 2 mm, more preferably 0.6 to 1 mm, is formed of a flame-retarded expandable graphite which forms at least 80, preferably 100 wt % of the layer.

Suitable expandable graphite for the present invention includes graphites of any type which are expandable on heating. Such expandable graphites (for example, those referred to as graphitic acids and graphite salts) are known. These are generally graphites whose interstitial planes incorporate extraneous atoms, ions or molecule groups. Preferred expandable graphites are those referred to as expandable NOx and SOx graphites, preparable by the action of sulfuric or nitric acid on graphite, optionally in the presence of an oxidizing agent (for example, $H_2O_2$). Suitable expandable graphites are also obtainable electrochemically.

EP 0 515 892 A1 describes suitable expandable graphites and also methods for applying them.

In accordance with the invention the fourth layer contains a flame retardant with an amount of at least 1 wt % of flame retardant and preferably less than 10 wt % of flame retardant. It has emerged that with levels of flame retardant of this kind, there is no adverse effect, or virtually none, on the properties of the layer. In the invention, the lower the fractions of flame retardant in the layer, the greater the preference according to such fractions. The layer contains preferably less than 8 wt %, more preferably less than 6 wt %, more particularly less than 3 wt %. The figures are based in each case on the total weight of the layer.

Flame retardants which can be used include, for example, aluminum oxide hydrates, zinc borates, ammonium phosphates and/or ammonium polyphosphates, antimony oxide, chlorinated paraffins, polychlorinated biphenyls, hexabrombenzene, polybrominated diphenyl ethers; cyanurates such as melaminecyanurate; organic phosphoric acid derivatives, as for example 2-carboxyethyl-phenylphosphoric acid; organic phosphates and polyphosphates, phosphites and phosphonates, as for example tritolyl phosphate, tert-butylphenyl diphenyl phosphate, bisphenol A-bis(diphenyl phosphate), resorcinol bis(diphenyl phosphate) and melamine polyphosphate, diethyl bis(2-hydroxyethyl)aminomethylphosphonate and diphenyl anilinophosphonate; phosphinic salts, diphosphinic salts and dialkylphosphinic salts; and also halogenated organic phosphorus compounds such as tris(2,3-dibrompropyl) phosphate, tris(2-brom-4-methylphenyl) phosphate and tris(2-chlorisopropyl) phosphate. Halogen-free flame retardants are preferred in the invention. The flame retardants which can be used in the invention are therefore preferably selected from the group consisting of aluminum oxide hydrates, zinc borates, ammonium phosphates and ammonium polyphosphates, antimony oxide; cyanurates; organic phosphoric acid derivatives; organic phosphates, phosphites and phosphonates; phosphinic salts, disphosphinic salts and dialkyl phosphinic salts, and also mixtures of two or more of the above-recited flame retardants. More preferably the flame retardants which can be used in the invention are selected from the group consisting of ammonium polyphosphates and dialkyl phosphinic salts.

Dialkyl phosphinic salts preferred in the invention are those of the formula F2

in which $R^{III}$ and $R^{IV}$ are identical or different and are a linear or branched $C_1$- to $C_6$ alkyl radical; M is Mg, Ca, Al, Sb, Sn, Ge, Ti, Fe, Zr, Zn, Ce, Bi, Sr, Mn, Li, Na, K or a protonated nitrogen base; and m is a natural number from 1 to 4.

M is preferably Al, Ca, Ti, Zn, Sn or Zr.

$R^{III}$ and $R^{IV}$ are preferably identical or different and are a methyl, ethyl, n-propyl, isopropyl, n-butyl, isobutyl, tert-butyl, n-pentyl, isopentyl, n-hexyl or isohexyl radical.

Particularly preferred dialkyl phosphinic salts are aluminum trisdiethyl phosphinate, aluminum trismethylethyl phosphinate, aluminum trisethylbutyl phosphinate, titanyl bisdiethyl phosphinate, titanium tetrakisdiethyl phosphinate, titanyl bismethylethyl phosphinate, titanium tetrakismethylethyl phosphinate, titanyl bisethylbutyl phosphinate, titanium tetrakisethylbutyl phosphinate, zinc bisdiethyl phosphinate, zinc bismethylethyl phosphinate and zinc bisethylbutyl phosphinate, and also mixtures of one or more of these dialkyl phosphinic salts.

Besides the substances already mentioned, the flame retardant may in the invention comprise one or more substances known as synergists. Synergists may be present at 0.1 to 70 wt % in the flame retardant, based on the total weight of the flame retardant. More preferably the flame retardant comprises
  a) 60 to 99 wt % of one or more compounds selected from dialkyl phosphinic salts of the formula F2 and ammonium polyphosphates, and
  b) 1 to 40 wt % of one or more synergists,
the fractions being based on the total weight of the flame retardant and adding up to 100 wt %.

The synergists are preferably compounds of nitrogen, of phosphorus or of nitrogen and phosphorus. More preferably the synergist or synergists is or are selected from the group consisting of allantoin, cyanuric acid, glycoluril, urea, melamine, melam, melem, melon, melamine phosphate, melamine pyrophosphate, melamine polyphosphate, melam polyphosphate, melem polyphosphate, melon polyphosphate, melamine cyanurate, piperazine phosphate, piperazine pyrophosphate, carbodiimide, sterically hindered phenols, phosphine oxide, hypophosphite, cyclic phosphonates, triaryl (alkyl) phosphites, alkyl- and aryl-substituted phosphates, compounds of aluminum, of tin, of boron, of magnesium, of calcium and of cerium, zinc oxide, zinc carbonate, zinc stannate, zinc borate, zinc hydrogen phosphate, zinc pyrophosphate, zinc oleate, zinc stearate and/or zinc phosphate.

Where the flame retardant comprises one or more synergists, they are regarded in the invention as part of the flame retardant. If present, therefore, they are included in particular as well in the fractions of flame retardant mentioned in preceding sections.

The flame retardant may be incorporated into the compositions of the layer using customary mixing devices, such as with agitator mechanisms, for example. Incorporation takes place preferably before the layer in question is applied.

Furthermore, silicone-based additives may be added which support the effect of the flame retardants. Such additives are described for example in U.S. Pat. No. 4,387,176 A.

The fifth layer, which is formed by a second, acrylate-based pressure-sensitive adhesive with a basis weight of 300 to 1500 g/m², preferably 360 to 1500 g/m², more preferably 600 to 1200 g/m² and/or a thickness of 400 to 1800 μm, preferably 500 to 1500 μm, more preferably 800 to 1200 μm, is preferably a foamed, acrylate-based adhesive, of the kind available for example from tesa under the designation ACX$^{Plus}$.

The ACX$^{Plus}$ range encompasses single-ply or multi-ply adhesive tapes which have foamed, acrylate-based adhesives.

Adhesive tapes of this kind preferably have a carrier layer which is also referred to as the hard phase. The polymer basis of the hard phase is preferably selected from the group consisting of polyvinyl chlorides (PVC), polyethylene terephthalates (PET), polyurethanes, polyolefins, polybutylene terephthalates (PBT), polycarbonates, polymethyl methacrylates (PMMA), polyvinyl butyrals (PVB), ionomers, and mixtures of two or more of the above-recited polymers. More preferably the polymer basis of the hard phase is selected from the group consisting of polyvinyl chlorides, polyethylene terephthalates, polyurethanes, polyolefins, and mixtures of two or more of the above-recited polymers. The hard phase is essentially a polymer film whose polymer basis is selected from the materials above. A "polymer film" is a thin, sheetlike, flexible, windable web whose material basis is formed substantially of one or more polymers.

"Polyurethanes" in the broad sense are polymeric substances in which repeating units are linked to one another by urethane moieties—NH—CO—O—.

"Polyolefins" are polymers which on an amount-of-substance basis contain at least 50% of repeating units of the general structure—[—CH2-CR1R2-]n-, in which R1 is a hydrogen atom and R2 is a hydrogen atom or is a linear or branched, saturated aliphatic or cycloaliphatic group. Where the polymer basis of the hard phase comprises polyolefins, these olefins are more preferably polyethylenes, more particularly ultra-high molar mass polyethylenes (UHMWPE).

The "polymer basis" is understood to be the polymer or polymers making up the greatest weight fraction of all the polymers present in the relevant layer or phase.

The thickness of the hard phase is in particular 150 μm. The thickness of the hard phase is preferably 10 to 150 μm, more preferably 30 to 120 μm and more particularly 50 to 100 μm, as for example 70 to 85 μm. The "thickness" refers to the extent of the relevant layer or phase along the z-ordinate of an imagined coordinate system in which the x-y plane is formed by the plane spanned by the machine direction and the cross direction to the machine direction. The thickness is ascertained by measurement at not less than five different places on the relevant layer or phase, with subsequent formation of the arithmetic mean from the measurement results obtained. The thickness of the hard phase is measured here in agreement with DIN EN ISO 4593.

Adhesive tapes of this kind may also have a soft phase, comprising a polymer foam, a viscoelastic mass and/or an elastomeric mass. The polymer basis of the soft phase is preferably selected from polyolefins, polyacrylates, polyurethanes, and mixtures of two or more of the above-recited polymers.

In the simplest version the adhesive tape consists only of a soft phase.

A "polymer foam" is a structure composed of gas-filled spherical or polyhedral cells which are bounded by liquid, semi-liquid, high-viscosity or solid cell struts; furthermore, the main constituent of the cell struts is a polymer or a mixture of two or more polymers.

A "viscoelastic mass" refers to a material which as well as exhibiting features of pure elasticity (return to the original state after external mechanical exposure) also exhibits features of a viscous liquid, such as the occurrence of internal friction on deformation. Polymer-based PSAs in particular are regarded as being viscoelastic masses.

An "elastomeric mass" refers to a material which exhibits rubber-elastic behavior and which at 20° C. can be stretched repeatedly to at least twice its length and, when the force needed for the stretching is removed, immediately reoccupies dimensions close to its starting dimensions.

As regards the understanding of the terms "polymer basis", "polyurethanes" and "polyolefins", the definitions above are valid. "Polyacrylates" are polymers whose monomer basis consists to an extent of at least 50%, on an amount-of-substance basis, of acrylic acid, methacrylic acid, acrylic esters and/or methacrylic esters, with acrylic esters and/or methacrylic esters being included at least proportionally, in general and preferably, at not less than 50%. More particularly a "polyacrylate" is a polymer obtainable by radical polymerization of acrylic and/or methyl acrylic monomers and also, optionally, further, copolymerizable monomers.

With particular preference the polymer basis of the soft phase is selected from polyolefins, polyacrylates and mixtures of two or more of the above-recited polymers. Where polyolefins form part of the polymer basis of the soft phase, they are preferably selected from polyethylenes, ethylene-vinyl acetate copolymers (EVA) and mixtures of polyethylenes and ethylene-vinyl acetate copolymers (PE/EVA blends). These polyethylenes may be different types of polyethylene, as for example HDPE, LDPE, LLDPE, blends of these polyethylene types and/or mixtures thereof.

In one embodiment the soft phase comprises a foam and a pressure-sensitive adhesive layer disposed respectively above and below the foamed layer, with the polymer basis of the foam consisting of one or more polyolefins, and the polymer basis of the pressure-sensitive adhesive layers consisting of one or more polyacrylates. More preferably the polymer basis of this foam consists of one or more polyethylenes, ethylene-vinyl acetate copolymer(s) and mixtures of one or more polyethylene(s) and/or ethylene-vinyl acetate copolymer(s). Very preferably the polymer basis of this foam consists of one or more polyethylenes.

The polyolefin-based foam itself has only very little pressure-sensitive adhesiveness, or none. The bond with the hard phase or with the substrate is therefore brought about advantageously through the pressure-sensitive adhesive layers. The foaming of the polyolefin-based starting material of the foam is brought about preferably by added blowing gas in a physical foaming process, and/or by means of a chemical foaming agent, as for example by azodicarbonamide.

In another embodiment, the soft phase is a pressure-sensitive adhesive polymer foam whose polymer basis consists of one or more polyacrylates. "Pressure-sensitive adhesive foam" means that the foam itself is a PSA and there is therefore no need for an additional pressure-sensitive adhesive layer to be applied. This is advantageous because in the production operation there are fewer layers to be assembled and the risk of detachment phenomena and of other unwanted manifestations at the layer boundaries is reduced.

The polyacrylates are preferably obtainable by at least proportional copolymerization of functional monomers which are crosslinkable with epoxide groups. These monomers are more preferably those with acid groups (particularly carboxylic, sulfonic or phosphonic acid groups) and/or hydroxyl groups and/or acid anhydride groups and/or epoxide groups and/or amine groups; especially preferred are monomers containing carboxylic acid groups. It is particularly advantageous for the polyacrylates to contain copolymerized acrylic acid and/or methacrylic acid. All of these groups feature crosslinkability with epoxide groups, thereby making the polyacrylates amenable advantageously to thermal crosslinking with introduced epoxides.

Other monomers which may be used as comonomers for the polyacrylates, aside from acrylic and/or methacrylic esters having up to 30 carbon atoms, are, for example, vinyl esters of carboxylic acids containing up to 20 carbon atoms, vinyl aromatics having up to 20 carbon atoms, ethylenically unsaturated nitriles, vinyl halides, vinyl ethers of alcohols containing 1 to 10 carbon atoms, aliphatic hydrocarbon atoms having 2 to 8 carbon atoms and one or two double bonds, or mixtures of these monomers.

The properties of the polyacrylate in question may be influenced in particular by variation in the glass transition temperature of the polymer through different weight fractions of the individual monomers. The polyacrylates may be derived preferably from the following monomer composition:

a) acrylic esters and/or methacrylic esters of the following formula

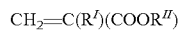

$CH_2=C(R^I)(COOR^{II})$ where $R^I$ is =H or $CH_3$ and $R^{II}$ is an alkyl radical having 4 to 14 carbon atoms, b) olefinically unsaturated monomers having functional groups of the kind already defined for reactivity with epoxide groups, c) optionally further acrylates and/or methacrylates and/or olefinically unsaturated monomers which are copolymerizable with component (a).

The polyacrylates derive preferably from a monomer composition in which the monomers of component (a) are present with a fraction of 45 to 99 wt %, the monomers of component (b) with a fraction of 1 to 15 wt % and the monomers of component (c) with a fraction of 0 to 40 wt % (the figures are based on the monomer mixture for the "base polymer", i.e. without additions of possible additives to the completed polymer, such as resins, etc.). In this case the polymerization product has a glass transition temperature of 15° C. (DMA at low frequencies) and pressure-sensitive adhesive properties.

The monomers of component (a) are more particularly plasticizing and/or non-polar monomers. Used preferably as monomers (a) are acrylic and methacrylic esters having alkyl groups consisting of 4 to 14 carbon atoms, more preferably 4 to 9 carbon atoms. Examples of such monomers are n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as, for example, 2-ethylhexyl acrylate or 2-ethylhexyl methacrylate.

The monomers of component (b) are more particularly olefinically unsaturated monomers having functional groups, especially having functional groups able to enter into a reaction with epoxide groups.

Used preferably for component (b) are monomers having functional groups selected from the group encompassing the following: hydroxyl, carboxyl, sulfonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinyl acetic acid, vinyl phosphonic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

In principle it is possible as component (c) to use all vinylically functionized compounds which are copolymerizable with component (a) and/or with component (b). The monomers of component (c) may serve to adjust the properties of the resultant PSA.

Illustrative monomers of component (c) are as follows: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethyl acrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (molecular weight $M_w$ of 4000 to 13 000 g/mol), poly(methyl methacrylate)-ethyl methacrylate ($M_w$ of 2000 to 8000 g/mol).

Monomers of component (c) may advantageously also be selected such that they include functional groups which support subsequent radiation-chemical crosslinking (by electron beams or UV, for example). Suitable copolymerizable photo initiators are, for example, benzoin acrylate and acrylate-functionalized benzophenone derivatives. Monomers which support crosslinking by electron bombardment are, for example, tetrahydrofurfuryl acrylate, N-tert-butylacrylamide and allyl acrylate.

The polyacrylates ("polyacrylates" are understood in the context of the invention to be synonymous with "poly(meth) acrylates") may be prepared by methods familiar to the skilled person, especially advantageously by conventional radical polymerizations or controlled radical polymerizations. The polyacrylates may be prepared by copolymerization of the monomeric components using the customary polymerization initiators and also, optionally, chain transfer agents, the polymerization being carried out at the customary temperatures in bulk, in emulsion, for example in water or liquid hydrocarbon atoms, or in solution.

The polyacrylates are prepared preferably by polymerization of the monomers in solvents, more particularly in solvents having a boiling range of 50 to 150° C., preferably of 60 to 120° C., using the customary amounts of polymerization initiators, which in general are 0.01 to 5, more particularly 0.1 to 2 wt % (based on the total weight of the monomers).

Suitable in principle are all customary initiators familiar to the skilled person. Examples of radical sources are peroxides, hydroperoxides and azo compounds, for example dibenzoyl peroxide, cumene hydroperoxide, cyclohexanone peroxide, di-t-butyl peroxide, cyclohexylsulfonyl acetyl peroxide, diisopropyl percarbonate, t-butyl peroctoate and benzopinacol. One very preferred procedure uses as radical initiator 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Suitable solvents for preparing the polyacrylates include alcohols such as methanol, ethanol, n- and isopropanol, n- and isobutanol, preferably isopropanol and/or isobutanol, and also hydrocarbon atoms such as toluene and, more particularly, mineral spirits with a boiling range from 60 to 120° C. Further possibilities for use include ketones such as preferably acetone, methyl ethyl ketone, methyl isobutyl ketone, and esters such as ethyl acetate, and also mixtures of solvents of the type stated, with preference being given to mixtures which comprise isopropanol, especially in amounts of 2 to 15 wt %, preferably 3 to 10 wt %, based on the solvent mixture employed.

The preparation (polymerization) of the polyacrylates is followed preferably by a concentration procedure, and the further processing of the polyacrylates takes place with substantial absence of solvent. The concentration of the polymer may be accomplished in the absence of crosslinker and accelerator substances. Also possible, however, is the addition of one of these classes of compound to the polymer even prior to the concentration, in which case concentration does take place in the presence of said substance(s).

After the concentration step, the polymers may be transferred to a compounder. It is possible as an option for concentration and compounding to take place in the same reactor as well.

The weight-average molecular weights Mw of the polyacrylates are preferably in a range from 20 000 to 2 000 000 g/mol, very preferably in a range from 100 000 to 1 000 000 g/mol, most preferably in a range from 150 000 to 500 000 g/mol. For that purpose, it may be advantageous to carry out the polymerization in the presence of suitable chain transfer agents such as thiols, halogen compounds and/or alcohols, in order to set the desired average molecular weight.

The polyacrylate preferably has a K value of 30 to 90, more preferably of 40 to 70, measured in toluene (1% strength solution, 21° C.). The K value according to Fikentscher is a measure of the molecular weight and viscosity of the polymer.

Particularly suitable are polyacrylates which have a narrow molecular weight distribution (polydispersity PD<4). These materials in spite of a relatively low molecular weight after crosslinking have a particularly good shear strength. The relatively low polydispersity also facilitates processing from the melt, since the flow viscosity is lower than for a broader-range polyacrylate while application properties are largely the same. Narrow-range poly(meth)acrylates can be prepared advantageously by anionic polymerization or by controlled radical polymerization methods, the latter being especially suitable. Examples of polyacrylates of this kind prepared by the RAFT process are described in U.S. Pat. No. 6,765,078 B2 and U.S. Pat. No. 6,720,399 B2. Via N-oxyls as well it is possible to prepare such polyacrylates, as described, for example, in EP 1 311 555 B1. Furthermore, advantageously, Atom Transfer Radical Polymerization (ATRP) may be employed for the synthesis of narrow-range polyacrylates, the initiator used comprising preferably monofunctional or difunctional secondary or tertiary halides and the halide(s) being abstracted using complexes of Cu, Ni, Fe, Pd, Pt, Ru, Os, Rh, Co, Ir, Ag or Au. The various possibilities of the ATRP are described in specifications U.S. Pat. Nos. 5,945,491 A, 5,854,364 A and U.S. Pat. No. 5,789,487 A.

The monomers for preparing the polyacrylates preferably include proportionally functional groups suitable for entering into linking reactions with epoxide groups. This advantageously permits thermal crosslinking of the polyacrylates by reaction with epoxides. Linking reactions are understood to be, in particular, addition reactions and substitution reactions. Preferably, therefore, there is a linking of the building blocks carrying the functional groups to building blocks carrying epoxide groups, more particularly in the sense of a crosslinking of the polymer building blocks carrying the functional groups via linking bridges comprising crosslinker molecules which carry epoxide groups. The substances containing epoxide groups are preferably polyfunctional epoxides, in other words those having at least two epoxide groups; accordingly, the overall result is preferably an indirect linking of the building blocks carrying the functional groups.

The polyacrylate or polyacrylates are crosslinked preferably by linking reactions—especially in the sense of addition reactions or substitution reactions—of functional groups they contain with thermal crosslinkers. All thermal crosslinkers may be used which not only ensure a sufficiently long processing life, meaning that there is no gelling during the processing operation, but also lead to rapid postcrosslinking of the polymer to the desired degree of crosslinking at temperatures lower than the processing temperature, more particularly at room temperature. Possible for example is a combination of carboxyl-, amino- and/or hydroxyl-containing polymers and isocyanates, as crosslinkers, more particularly the aliphatic or amine-deactivated trimerized isocyanates described in EP 1 791 922 A1.

Suitable isocyanates are, more particularly, trimerized derivatives of MDI [4,4-methylenedi(phenyl isocyanate)], HDI [hexamethylene diisocyanate, 1,6-hexylene diisocyanate] and/or IPDI [isophorone diisocyanate, 5-isocyanato-1-isocyanatomethyl-1,3,3-trimethylcyclohexane], examples being the types Desmodur® N3600 and XP2410 (each BAYER AG: aliphatic polyisocyanates, low-viscosity HDI trimers). Likewise suitable is the surface-deactivated dispersion of micronized trimerized IPDI BUEJ 339®, now HF9® (BAYER AG).

Also suitable in principle for the crosslinking, however, are other isocyanates such as DesmodurVL 50 (MDI-based polyisocyanates, Bayer AG), Basonat F200WD (aliphatic polyisocyanate, BASF AG), Basonat HW100 (water-emulsifiable polyfunctional, HDI-based isocyanate, BASF AG), Basonat HA 300 (allophanate-modified polyisocyanate based on HDI isocyanurate, BASF) or Bayhydur VPLS2150/1 (hydrophilically modified IPDI, Bayer AG).

Preference is given to using the thermal crosslinker, for example the trimerized isocyanate, at 0.1 to 5 wt %, more particularly at 0.2 to 1 wt %, based on the total amount of the polymer to be crosslinked.

The thermal crosslinker preferably comprises at least one substance containing epoxide groups. The substances containing epoxide groups are more particularly polyfunctional epoxides, in other words those having at least two epoxide groups; accordingly, the overall result is an indirect linking of the building blocks that carry the functional groups. The substances containing epoxide groups may be aromatic compounds and may be aliphatic compounds.

Outstandingly suitable polyfunctional epoxides are oligomers of epichlorohydrin, epoxy ethers of polyhydric alcohols (more particularly ethylene, propylene and butylene glycols, polyglycols, thiodiglycols, glycerol, pentaerythritol, sorbitol, polyvinyl alcohol, polyallyl alcohol and the like), epoxy ethers of polyhydric phenols [more particularly resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, bis(4-hydroxyphenyl)phenylmethane, bis(4-hydroxyphenyl)diphenylmethane, bis(4-hydroxyphenyl)-4'-methylphenyl-methane, 1,1-bis(4-hydroxyphenyl)-2,2,2-trichloroethane, bis(4-hydroxyphenyl)(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulfone] and also their hydroxyethyl ethers, phenol-formaldehyde condensation products, such as phenol alcohols, phenol aldehyde resins and the like, S- and N-containing epoxides (for example N,N-diglycidylaniline, N,N'-dimethyldiglycidyl-4,4-diaminodiphenylmethane) and also epoxides prepared by customary methods from polyunsaturated carboxylic acids or monounsaturated carboxylic esters of unsaturated alcohols, glycidyl esters, polyglycidyl esters, which may be obtained by polymerization or copolymerization of glycidyl esters of unsaturated acids or are obtainable from other acidic compounds (cyanuric acid, diglycidyl sulfide, cyclic trimethylene trisulfone and/or derivatives thereof, and others).

Very suitable ethers are, for example, 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, bisphenol A diglycidyl ether and bisphenol F diglycidyl ether.

Particular preference is given to the use of a crosslinker-accelerator system ("crosslinking system") described for example in EP 1 978 069 A1, in order to gain more effective control over not only the processing life and crosslinking kinetics but also the degree of crosslinking. The crosslinker-accelerator system comprises at least one substance containing epoxide groups, as crosslinker, and at least one substance which has an accelerating effect on crosslinking reactions by means of epoxide-functional compounds at a temperature below the melting temperature of the polymer to be crosslinked, as accelerator.

Accelerators used are more preferably amines (to be interpreted formally as substitution products of ammonia; in the formulae below, these substituents are represented by "R" and encompass in particular alkyl and/or aryl radicals and/or other organic radicals), more especially preferably those amines which enter into no reactions or only slight reactions with the building blocks of the polymers to be crosslinked.

Selectable in principle as accelerators are primary ($NRH_2$), secondary ($NR_2H$) and tertiary ($NR_3$) amines, and also of course those which have two or more primary and/or secondary and/or tertiary amine groups. Particularly preferred accelerators, however, are tertiary amines such as, for example, triethylamine, triethylenediamine, benzyldimethylamine, dimethylaminomethylphenol, 2,4,6-tris(N,N-dimethylaminomethyl)phenol and N,N'-bis(3-(dimethylamino)propyl)urea. As accelerators it is also possible with advantage to use polyfunctional amines such as diamines, triamines and/or tetramines. Outstandingly suitable are diethylenetriamine, triethylenetetramine and trimethylhexamethylenediamine, for example.

Used with preference as accelerators, furthermore, are amino alcohols. Particular preference is given to using secondary and/or tertiary amino alcohols, where in the case of two or more amine functionalities per molecule, preferably at least one, and preferably all, of the amine functionalities are secondary and/or tertiary. As preferred aminoalcohol accelerators it is possible to employ triethanolamine, N,N-bis(2-hydroxypropyl)ethanolamine, N-methyldiethanolamine, N-ethyldiethanolamine, 2-aminocyclohexanol, bis(2-hydroxycyclohexyl)methylamine, 2-(diisopropylamino)ethanol, 2-(dibutylamino)ethanol, N-butyldiethanolamine, N-butylethanolamine, 2-[bis(2-hydroxyethyl)amino]-2-(hydroxymethyl)-1,3-propanediol, 1-[bis(2-hydroxyethyl)amino]-2-propanol, triisopropanolamine, 2-(dimethylamino)ethanol, 2-(diethylamino)ethanol, 2-(2-dimethylaminoethoxy)ethanol, N,N,N'-trimethyl-N'-hydroxyethyl bisaminoethyl ether, N,N,N'-trimethylaminoethylethanolamine and/or N,N,N'-trimethylaminopropylethanolamine.

Other suitable accelerators are pyridine, imidazoles (such as, for example, 2-methylimidazole) and 1,8-diazabicyclo[5.4.0]undec-7-ene. Cycloaliphatic polyamines as well may be used as accelerators. Suitable also are phosphate-based accelerators such as phosphines and/or phosphonium compounds, such as triphenylphosphine or tetraphenylphosphonium tetraphenylborate, for example.

It is also possible that even a polymer foam that per se has the property of pressure-sensitive adhesiveness, with a polymer basis consisting of polyacrylate(s), has been coated on its upper and/or lower side with a PSA, with the polymer basis of this PSA preferably likewise consisting of polyacrylates. Alternatively, it is possible to laminate different and/or differently pretreated adhesive layers, in other words, for example, pressure-sensitive adhesive layers and/or heat-activatable layers based on polymers other than poly(meth)acrylates, to form the foamed layer. Suitable base polymers are natural rubbers, synthetic rubbers, acrylate block copolymers, vinyl aromatic block copolymers, especially styrene block copolymers, EVA, polyolefins, polyurethanes, polyvinyl ethers and silicones. These layers preferably contain no significant fractions of migratable constituents, whose compatibility with the material of the foamed layer is sufficiently good that they diffuse in significant amount into the foamed layer and alter its properties.

Generally speaking, the soft phase of the adhesive tape may comprise at least one tackifying resin. Tackifying resins which can be used are, in particular, aliphatic, aromatic and/or alkylaromatic hydrocarbon resins, hydrocarbon resins based on pure monomers, hydrogenated hydrocarbon resins, functional hydrocarbon resins, and natural resins. The tackifying resin is preferably selected from the group encompassing pinine resins, indene resins and rosins, their disportionated, hydrogenated, polymerized and/or esterified derivatives and salts, terpene resins and terpene-phenolic resins, and also C5, C9 and other hydrocarbon resins. Combinations of these and further resins may also be used advantageously to adjust the properties of the resultant adhesive in line with requirements. More preferably the tackifying resin is selected from the group encompassing terpene-phenolic resins and rosin esters.

The soft phase of the adhesive tape may comprise one or more fillers. The filler or fillers may be present in one or in two or more layers of the soft phase.

Preferably the soft phase comprises a polymer foam, and the polymer foam comprises partially or fully expanded microballoons, particularly if the polymer basis of the polymer foam comprises one or more polyacrylates, and very preferably if the polymer basis of the polymer foam consists of one or more polyacrylates. Microballoons are elastic hollow spheres which have a thermoplastic polymer shell; they are therefore also referred to as expandable polymeric microspheres or as hollow microspheres. These spheres are filled with low-boiling liquids or with liquefied gas. Shell material used includes, in particular, polyacrylonitrile, polyvinyl dichloride (PVDC), polyvinylchloride (PVC), polyamides or polyacrylates. Low-boiling liquid more suitably includes, in particular, lower alkanes, such as isobutane or isopentane, which are enclosed as a liquefied gas under pressure in the polymer shell. Physical action on the microballoons, through exposure to heat, for example, particularly by supply of heat or generation of heat, brought about for example by ultrasound or by microwave radiation, first causes the outer polymer shell to soften, and at the same time the liquid blowing gas located within the shell undergoes transition into its gaseous state. Given a certain pairing of pressure and temperature—also referred to as the critical pairing—the microballoons undergo irreversible expansion, and expand three-dimensionally. Expansion is at an end when the internal pressure matches the external pressure. As the polymeric shell is retained, the result is a closed-cell foam.

A large number of types of microballoons are available commercially, such as, for example, from Akzo Nobel the Expancel DU (dry unexpanded) products, which differ essentially in their size (6 to 45 µm diameter in the unexpanded state) and in the starting temperature they require for expansion (75° C. to 220° C.).

Also available are unexpanded microballoon products, in the form of an aqueous dispersion having a solids fraction or microballoon fraction of around 40 to 45 wt %; additionally, there are polymer-bound microballoons (masterbatches), for example in ethylene-vinyl acetate with a microballoon concentration of around 65 wt %. Obtainable, furthermore, are what are called microballoon slurry systems, in which the microballoons take the form of an aqueous dispersion with a solids fraction of 60 to 80 wt %. The microballoon dispersions, the microballoon slurries and the masterbatches, like the DU products, are suitable for foaming a polymer foam present in the soft phase of the adhesive tape.

With particular preference the polymer foam comprises microballoons which in the unexpanded state at 25° C. have a diameter of 3 µm to 40 µm, more particularly of 5 µm to 20 µm, and/or which after expansion have a diameter of 10 µm to 200 µm, more particularly of 15 µm to 90 µm.

The polymer foam contains preferably up to 30 wt % of microballoons, more particularly between 0.5 wt % and 10 wt %, based in each case on the total mass of the polymer foam.

The polymer foam of the soft phase of the adhesive tape—to the extent that this phase comprises a polymer foam—is preferably characterized by the substantial absence of open-cell cavities. With particular preference the proportion of cavities without their own polymer shell, i.e., the proportion of open-cell caverns, in the polymer foam is not more than 2 vol %, more particularly not more than 0.5 vol %. The polymer foam is therefore preferably a closed-cell foam.

The soft phase of the adhesive tape may optionally also comprise pulverulent and/or granular fillers, dyes and pigments, including in particular abrasive and reinforcing fillers such as, for example, chalks (CaCO3), titanium dioxides, zinc oxides and carbon blacks, and including in high fractions, i.e., from 0.1 to 50 wt %, based on the total mass of the soft phase.

Further possible constituents of the soft phase may include low-flammability fillers such as, for example, ammonium polyphosphate; electrically conductive fillers such as, for example, conductive carbon black, carbon fibers and/or silver-coated beads; thermally conductive materials such as, for example, boron nitride, aluminum oxide, silicon carbide; ferromagnetic additives such as, for example, iron (III) oxides; other additives for increasing volume, such as, for example, expandants, solid glass beads, hollow glass beads, carbonized microbeads, hollow phenolic microbeads, microbeads made of other materials; silica, silicates, organically renewable raw materials such as, for example, wood flour, organic and/or inorganic nanoparticles, fibers; ageing inhibitors, light stabilizers, antiozonants and/or compounding agents. Ageing inhibitors that can be used are preferably not only primary inhibitors, e.g., 4-methoxyphenol or Irganox® 1076, but also secondary ageing inhibitors, e.g., Irgafos® TNPP or Irgafos® 168 from BASF, optionally also in combination with one another. Other ageing inhibitors that can be used are phenothiazine (C-radical scavenger) and also hydroquinone methyl ether in the presence of oxygen, and also oxygen itself.

The thickness of the soft phase is preferably 200 to 1800 µm, more preferably 300 to 1500 µm, more particularly 400 to 1000 µm. The thickness of the soft phase is determined according to ISO 1923.

The joining of hard phase and soft phase, or else of layers provided in the hard and/or soft phase, to one another to form the adhesive tape may be accomplished, for example, by laminating or coextrusion. It is possible that hard phase and soft phase are joined to one another directly, in other words without mediation. It is equally possible that one or more adhesion-promoting layers are disposed between hard phase and soft phase. The adhesive tape, furthermore, may comprise further layers.

Preferably at least one of the layers to be joined to one another, more preferably a plurality of the layers to be joined to one another, and very preferably all of the layers to be joined to one another, has or have been pretreated by Corona (with air or nitrogen), plasma (air, nitrogen or other reactive gases or reactive compounds employable as aerosol) or flame pretreatment techniques.

Preferably all of the layers in the diecut have the same shape and size and are arranged congruently.

A typical size for the diecut, allowing many of the smaller holes to be closed, is represented by a (circular) disk having a diameter of 10 to 100 mm, more particularly 20 to 60 mm, especially 30 to 40 mm.

The method of the invention for closing a hole especially in a vehicle body with a diecut of the invention simply involves applying the diecut to the hole to be closed, in such a way that the hole is completely covered by the diecut.

It is preferred for the diecut to be applied concentrically over the hole to be closed. The contours of the diecut advantageously correspond to the contour of the hole to be closed. In this way the overlap of the individual layers of the diecut is symmetrical. The margin of overlap is preferably between 3 and 20 mm, more preferably between 5 and 10 mm.

The diecut of the invention is superior to the solutions known from the prior art, particularly under heightened mechanical stress.

The diecut is distinguished by:
very high flame retardancy
very high load-bearing capacity/tear resistance/puncture resistance
very good sealing with respect to moisture/moisture barrier
very good sealing with respect to noise/sound damping
repaintability
PVC adhesion According to one advantageous embodiment of the invention, the diecut has puncture resistances of 200 to 2000 N.

The surface of the diecut part is attractive and smooth in respect of optical and tactile qualities, and consequently has good repaintability.

TEST METHODS

The measurements are conducted (unless otherwise indicated) under testing conditions of 23±1° C. and 50±5% relative humidity.

Molar Mass Mn and Weight-Average Molar Mass Mw, and Polydispersity PD

The figures for the number-average molar mass Mn and the weight-average molar mass Mw and also the polydispersity PD in this specification relate to the determination by gel permeation chromatography (GPC). The determination is made on 100 µl of sample having undergone clarifying filtration (sample concentration 4 g/l). The eluent used is tetrahydrofuran with 0.1 vol % of trifluoroacetic acid. The measurement is made at 25° C.

The precolumn used is a PSS-SDV-type column, 10 µm, $10^3$ Å, 8.0 mm*50 mm (statements here and below in the following order: type, particle size, porosity, internal diameter*length; 1 Å=$10^{-10}$ m). Separation takes place using a combination of the columns of type PSS-SDV, 10 µm, $10^3$ Å and also $10^5$ Å and $10^7$ Å each of 8.0 mm×300 mm (columns from Polymer Standards Service; detection by means of Shodex R171 differential refractometer). The flow rate is 1.0 ml per minute.

Calibration is carried out using the commercially available ReadyCal-Kit poly(styrene) high from PSS Polymer Standards Service GmbH, Mainz. It is converted using the Mark-Houwink parameters K and alpha universally into polymethyl methacrylate (PMMA), and so the data are reported in PMMA mass equivalents.

K Value

The principle of the method is based on capillary-viscosimetric determination of the relative solution viscosity. For this purpose, the test substance is dissolved by shaking for thirty minutes in toluene, to give a 1% strength solution. In a Vogel-Ossag viscometer at 25° C. the flow time is measured and from this, in relation to the viscosity of the pure solvent, the relative viscosity of the sample solution is ascertained. The K value can be read off from tables by the method of Fikentscher [P. E. Hinkamp, Polymer, 1967, 8, 381] (K=1000 k).

Glass Transition Temperature

The glass transition temperature is determined by means of dynamic scanning calorimetry (DSC). This is done by weighing out 5 mg of an untreated polymer sample into an aluminum crucible (volume 25 µL) and closing the crucible with a perforated lid.

Measurement takes place using a DSC 204 F1 from Netzsch. For inertization, operation takes place under nitrogen. The sample is first cooled to −150° C., then heated to +150° C. at a heating rate of 10 K/min, and again cooled to −150° C. The subsequent, second heating curve is run again at 10 K/min, and the change in the heat capacity is recorded. Glass transitions are recognized as steps in the thermogram.

Figure 1:
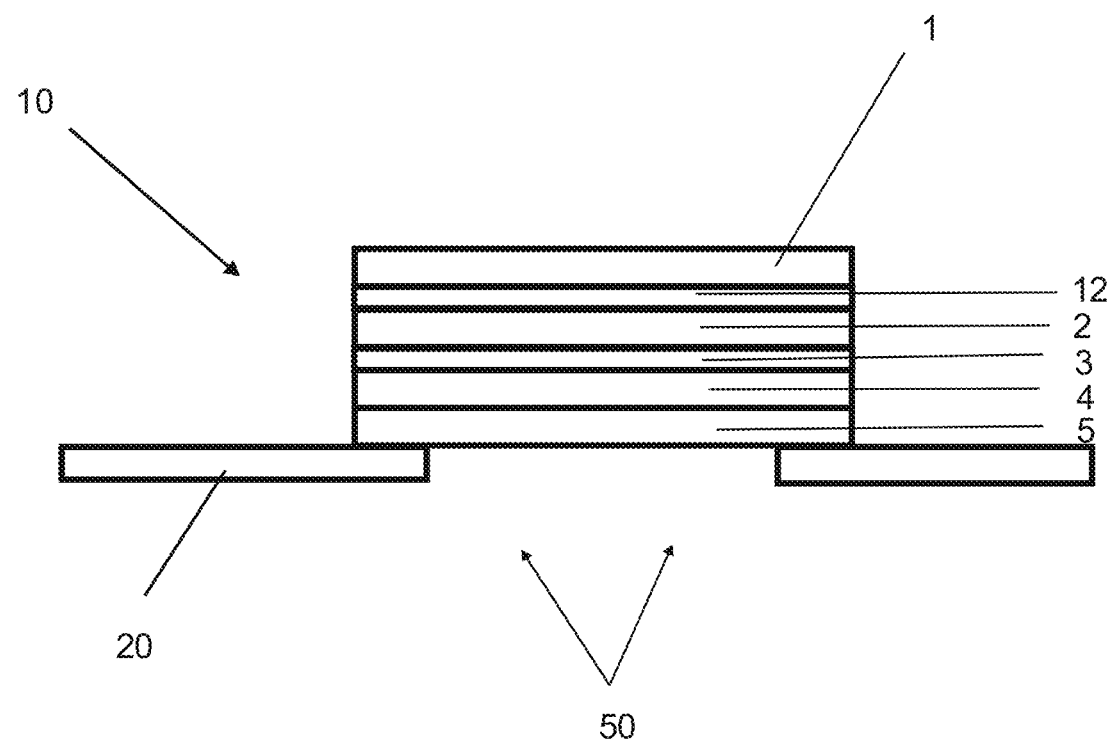
FIG. 1 shows a hole in a body that is to be closed, and also the state after closure of the hole that was to be closed.
Figure 2:
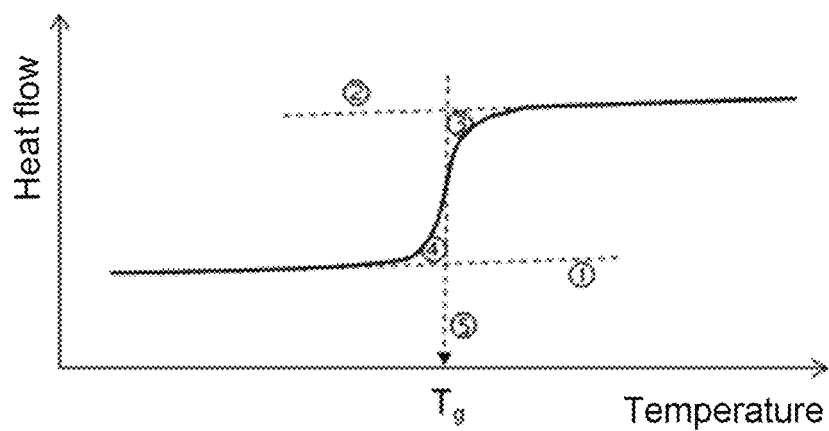
FIG. 2 is a graphical illustration of the glass transition temperature.
Figure 3A:
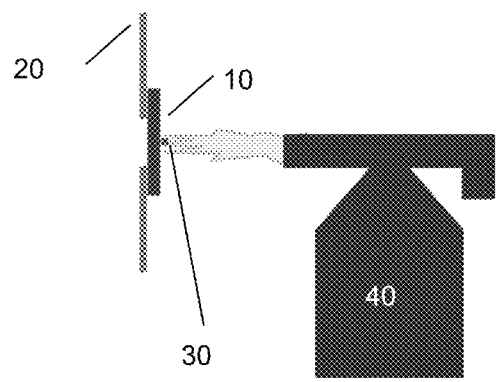
FIGS. 3A and 3B shows a vertical test and a horizontal test, respectively.
Figure 3B:
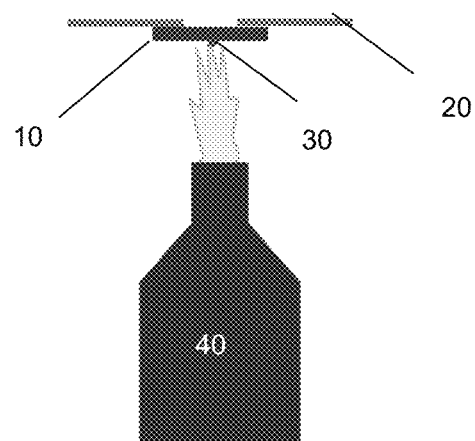

The glass transition temperature is evaluated as follows (see FIG. 2):

A tangent is applied in each case to the baseline of the thermogram before ① and after ② the step. In the region of the step, a balancing line ⑤ is placed parallel to the ordinate in such a way that it intersects the two tangents, specifically so as to form two areas ③ and ④ of equal content (between in each case the tangent, the balancing line, and the measuring plot). The point of intersection of the balancing lines thus positioned with the measuring plot gives the glass transition temperature.

Peel Adhesion

The peel adhesion (in accordance with AFERA 5001) is determined as follows: the defined substrate used is galvanized steel sheet with a thickness of 2 mm (obtained from Rocholl GmbH). The bondable sheetlike element under investigation is cut to a width of 20 mm and a length of about 25 cm, is provided with a handling section, and immediately thereafter is pressed onto the selected substrate five times using a 4 kg steel roller, with a rate of advance of 10 m/min. Immediately after that, the bondable sheetlike element is peeled from the substrate at an angle of 180° using a tensile testing instrument (from Zwick) with a velocity v=300 mm/min, and the force needed to achieve this at room temperature is recorded. The recorded value (in N/cm) is obtained as the average from three individual measurements.

Puncture Resistance

With the puncture resistance, a determination is made of the maximum loading force of a diecut bonded over a hole at the point of puncture (for example, for closure of holes in the automobile industry).

Using a circular diecut, a hole in a metal sheet is closed. Testing takes place either immediately after bonding or after the prescribed storage condition. The maximum force recorded is reported as the puncture resistant result in N. The maximum force to puncture the test specimen is ascertained using a tensile testing machine. This tensile testing machine loads the bonded diecut part centrally with a die, which moves downward at 300 mm/min until a penetration depth of 20 mm has been reached.

The method is based on the use of a tensile testing machine, which has a spike clamped into its upper force recorder, the spike being moved at constant velocity (300 mm/min) toward a horizontally positioned hole in a metal sheet which is in turn closed with the diecut part. The hole selected is a circular cutout with a diameter of 30 mm. The steel sheet is 0.7 mm thick and is placed on a ring, allowing the spike to pass through the hole to 20 mm when it presses the hole closure. The point of the spike is rounded and represents the head of an ISO 8677 cup square bolt, having a diameter of 20 mm and an arc height of 3 mm, which has been welded to a recorder. A measurement is made of the force required to press the spike 20 mm through the hole. Where metal-sheet adhesion is very good, this value correlates to the tensile extension properties of the layerlike element in longitudinal and transverse directions.

The diecut under test (circular, 50 mm in diameter) is placed as far as possible centrally and without air inclusions over the hole of the metal sheet and rolled down using a 4 kg steel roller (five times back and forth at 10 m/min over the entire width of the diecut). Testing takes place, unless otherwise indicated, after less than 10 minutes from bonding (instantaneous testing).

The test can be carried out both on the carrier side and on the adhesive side. Unless otherwise indicated, it is carried out on the carrier side, meaning that the carrier side of the diecut faces upward.

The test specimen is placed and secured on the specimen holder in such a way that the diecut lies centrally on the holder and centrally beneath the die. The machine is then started with a velocity of 300 mm/min and the diecut is pressed downward through the hole in the metal sheet. The test ends when a penetration depth of 20 mm has been reached, even if the test specimen here has only been pressed in, and not yet punctured.

The puncture resistance is the average value from three individual results.

If the diecut has not been punctured, or if the bond has come undone, the result is reported preceded by "greater than/equal to".

Fire Tests

A diecut part (10) having a diecut-part diameter of 50 mm is applied concentrically to a cathodically electrocoated metal sheet (20) containing a circular hole with a hole diameter of 30 mm.

The diecut part is pretreated beforehand in an oven at 160° C. for 30 min.

The diecut is then allowed to cool to room temperature. This waiting time embraces a timespan of at least two hours.

Using a Bunsen burner (40), a flame is applied to the outer surface of the diecut part, to produce a temperature of 1000° C.+1-100° C. at the K-type temperature sensor (30) directly and centrally in front of the diecut.

There is a vertical test (specimen vertical, flame horizontal) and a horizontal test (specimen horizontal, flame vertical).

Below, on the basis of a figure, the diecut for the permanent closing of holes especially in metal sheets or in plastics parts of automobile bodies is to be elucidated in more detail, without any intention of a restrictive effect in any form.

The body 20 contains, as a result of its construction, a hole 50 which is to be closed. For this purpose, a diecut 10 with a carrier having the following construction 1 aluminum foil
12 PU adhesive
2 laid glass fabric
3 water-based acrylate composition
4 expandable graphite layer
5 foamed acrylate adhesive is secured on the hole 50 in such a way that the hole 50 is completely covered by the diecut 10.

The area of the diecut 10 is greater than the area of the hole 50 to be closed, and so the hole 50 is closed over its full area.

In the text below, the invention is elucidated in more detail by two examples, without wishing thereby to restrict the invention.

Example

| Layer 2: | Laid glass fabric in a PU layer | 85 g/m² |
| Layer 3: | Water-based acrylate composition | 95 g/m² |
| Layer 4: | Expandable graphite | 0.7 mm (PYRO-SAFE ® DG-CR from SVT) |
| Layer 5: | Foamed acrylate adhesive | 800 μm |
| Layer 1: | Aluminum foil | 18 μm |
| Layer 12: | PU adhesive | 7 g/m² |
| Layer 2: | Laid glass fabric in a PU layer | 85 g/m² |
| Layer 3: | Water-based acrylate composition | 95 g/m² |
| Layer 4: | Expandable graphite | 0.7 mm (PYRO-SAFE ® DG-CR from SVT) |
| Layer 5: | Foamed acrylate adhesive | 800 μm |

Comparative Example

In the comparative examples, the layer 4, the expandable graphite layer, and also the optional layers 1, 12, 2 and 3 are replaced by the respective layer listed in the table, and are likewise subjected to the vertical fire test (temperatures of 1000° C., up to a duration of at least 10 min).

It is found here that no layer produces a diecut which passes the fire test with comparably good results. The failure here is defined in the breakthrough of the flame through the hole.

| Material | Supplier/ product name | Thickness/ BW* of carrier material | Pro | Contra | Time to failure |
|---|---|---|---|---|---|
| Aluminum—laid glass fabric assembly in adhesive tape form | tesa SE tesa ® 54332 | 1060 μm | nonflammable | low temperature resistance of 500° C. | 21 seconds |
| Polyimide film with silicone adhesive | tesa SE tesa ® 51408 | 65 μm | low flammability | low temperature resistance of 300° C. (Melting) | 68 seconds |
| Aluminum adhesive tape | tesa SE tesa ® 50575 | 80 μm | nonflammable | heat conduction, adhesive melts | 17 seconds |
| Film of polyurethane acrylate | tesa SE | 100 g/m² | — | readily flammable | 17 seconds |
| PET film, aluminized | Coveme | 125 μm | — | heat conduction, PET and adhesive melt | 16 seconds |
| Laid glass fabric coated with phyllosilicates (phlogopite) | Mica Tapes Europe | 60 μm (1) 80 μm (2) 100 μm (3) 110 μm (4) | nonflammable, very high temperature resistance of around 1000° C., effective insulation at lower temperatures | no longer insulating at high temperatures, melting of the adhesive | 21 seconds (1) 27 seconds (2) 32 seconds (3) 29 seconds (4) |
| Woven glass fabric, thin | Jiangsu Jiuding New Material Co Ltd./EP 200Y | 180 μm | nonflammable, flexible | heat conduction, melting of the adhesive, fraying at the edges, low adhesion by the adhesive | 131 seconds |
| Woven glass fabric, open porosity | Jiangsu Jiuding New Material Co Ltd. JD 512FR | 110 μm | nonflammable | flame passes through the openings in the fabric, fraying at the edges, adhesion of the adhesive is low | 25 seconds |
| Aramid fibers and functional active ingredient combination joined by nitrile-butadiene binder | Frenzelit/ Novaform 2500 | 1000 μm | effective insulation at lower temperatures, basis weight | designed for the HT range, yet (low) flammability | 123 seconds |
| HT papers (SiO2, CaO, MgO) | DBW HT Papier 607 high | 2000 μm | nonflammable, very high temperature resistance of around 1000° C., effective insulation | dusts, open porosity, low adhesion of the adhesive | 60 seconds |
| Silicate wool (SiO$_2$, Al$_2$O$_3$) | DBW powermat ® S | 4000 μm | nonflammable, very effective insulation | dusts (possibly carcinogenic), fraying, difficult to handle, low adhesion of the adhesive | 300 seconds |
| Woven silicate fabric | Fingerhuth/ silTEX ® 1608.VC2.LD (1) silTEX ® 1615.HTLE.T (2) | 800 μm (1) 1500 μm (2) | nonflammable | fraying at the edges, low adhesion of the adhesive, partly open porosity | 142 seconds (1) 235 seconds (2) |
| Woven glass fabric, thick | Jiangsu Jiuding New Material Co Ltd. BWT600-83 | 400 μm | nonflammable, effective insulation | fraying at the edges, low adhesion of the adhesive | not subjected to this test, owing to the poor adhesion properties relative to the adhesive |
| Aerogel mats | Stadur Pyrogel 2250 | 2500 μm | nonflammable | stiff, dusty, unstable adhesion of the adhesive | not subjected to this test, owing to the poor adhesion properties relative to the adhesive |
| Woven para-aramid fabric (Kevlar) | Fingerhuth | 3000 μm | — | low temperature resistance of 350° C. | not subjected to the test, owing to the low temperature resistance |
| Four-or five-layer construction with expandable graphite (according to the invention) | PYRO-SAFE ® DG-CR (SVT Seevetal) | 700 μm 950 g/m² | nonflammable, lies like a protective cover over the adhesive, effective heat insulation | NO failure in the fire test | ≥10 min |

*BW: basis weight

The advantages of the diecut of the invention over the prior art are as follows:
- fire resistance up to temperatures of 1000° C. and up to a duration of at least 10 min in both fire tests
- low-temperature impact resistance
- clean bonding and no oozing of adhesive
- sufficient adhesion of the flame-retardant foam layer to the acrylate-based pressure-sensitive adhesive (in contrast to numerous comparison products, no cohesive fracture between the layers).

The invention claimed is:

1. A diecut adapted for closing holes in one or more metal sheets and/or one or more plastics parts, the diecut comprising:
    a carrier composed of a laminate assembly comprising a layer sequence having:
        at least one first layer formed by a metallic layer having a thickness of 10 to 40 μm;
        at least one second layer formed by a woven glass fabric or laid glass fabric having a basis weight of 30 to 200 g/m2;
        at least one third layer formed by a first pressure-sensitive adhesive having a basis weight of 70 to 200 g/m2;
        at least one fourth layer formed by an unexpanded expandable graphite having a thickness of 0.2 to 3.0 mm, wherein expandable graphite is produced from naturally occurring mineral graphite and present in the at least one fourth layer to an extent of at least 80 wt % and an expansion rate of the expandable graphite is 30 to 400 cm$^3$/g; and
        at least one fifth layer formed by a second, acrylate-based pressure-sensitive adhesive having a basis weight of 300 to 1800 g/m2 and/or a thickness of 400 to 1800 μm.

2. The diecut of claim 1, wherein the first metallic layer has a thickness of 12 to 20 μm.

3. The diecut of claim 2, wherein the thickness of the first metallic layer is about 18 μm.

4. The diecut of claim 1, wherein the first metallic layer is a rolled aluminum foil.

5. The diecut of claim 1, wherein the second layer of woven glass fabric or laid glass fabric has a basis weight of between 60 and 120 g/m2.

6. The diecut of claim 5, wherein the second layer of woven glass fabric or laid glass fabric has the basis weight of between 70 and 100 g/m2.

7. The diecut of claim 6, wherein the second layer of woven glass fabric or laid glass fabric has the basis weight of between 80 and 90 g/m2.

8. The diecut of claim 1, wherein the woven glass fabric or laid glass fabric is located in a polymer layer such that all filaments of the woven glass fabric or laid glass fabric are surrounded by polymer of the polymer layer.

9. The diecut of claim 8, wherein the polymer layer is a polyurethane-based polymer layer.

10. The diecut of claim 1, wherein a warp thread count and/or a weft thread count for the second layer of woven glass fabric or laid glass fabric is 20 to 40/cm.

11. The diecut of claim 10, wherein the warp thread count and/or the weft thread count for the second layer of woven glass fabric or laid glass fabric is 25 to 30/cm.

12. The diecut of claim 1, further comprising:
    a laminating adhesive layer is disposed between the first metallic layer and the second layer with a unit area coat weight of 5 to 50 g/m2.

13. The diecut of claim 12, wherein the unit area coat weight of the laminating adhesive layer is 7 to 20 g/m2.

14. The diecut of claim 1, wherein the third layer, formed by the first pressure-sensitive adhesive having a basis weight of 70 to 200 g/m2, is a water-based adhesive based on acrylate.

15. The diecut of claim 1, wherein the fifth layer, form by a second pressure-sensitive adhesive having a basis weight of 300 to 1800 g/m2, is a foamed, acrylate-based adhesive.

16. The diecut of claim 1, wherein the diecut is applied concentrically over a hole to be closed.

17. The diecut of claim 1, wherein the diecut correspond to a contour of a hole to be closed such that the margin of overlap is between 1 and 20 mm when the hole is closed by the diecut.

18. The diecut of claim 1, wherein the thickness of the at least one fourth layer is 0.5 to 1.0 mm.

19. The diecut of claim 1, wherein the second, acrylate-based pressure-sensitive adhesive has the basis weight of 360 to 1500 g/m2 and the thickness of 800 to 1500 μm.

20. A hole in a vehicle body covered with the diecut of claim 1.

* * * * *